(12) United States Patent
Xin et al.

(10) Patent No.: US 12,068,850 B2
(45) Date of Patent: *Aug. 20, 2024

(54) PREAMBLE WITH DETECTABLE WLAN VERSION IDENTIFICATION

(71) Applicants: Yan Xin, Ottawa (CA); Jung Hoon Suh, Ottawa (CA); Osama Aboul-Magd, Ottawa (CA)

(72) Inventors: Yan Xin, Ottawa (CA); Jung Hoon Suh, Ottawa (CA); Osama Aboul-Magd, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,829

(22) Filed: Jul. 6, 2023

(65) Prior Publication Data
US 2024/0007223 A1    Jan. 4, 2024

Related U.S. Application Data

(63) Continuation of application No. 17/862,279, filed on Jul. 11, 2022, which is a continuation of application
(Continued)

(51) Int. Cl.
*H04L 1/00* (2006.01)
*H04W 84/12* (2009.01)
*H04L 27/18* (2006.01)

(52) U.S. Cl.
CPC .......... *H04L 1/0057* (2013.01); *H04L 1/0071* (2013.01); *H04L 27/18* (2013.01); *H04W 84/12* (2013.01)

(58) Field of Classification Search
None
See application file for complete search history.

(56) References Cited

U.S. PATENT DOCUMENTS

| 10,122,563 | B1 | 11/2018 | Sun et al. |
| 10,904,920 | B1 * | 1/2021 | Noh ............ H04W 76/15 |

(Continued)

FOREIGN PATENT DOCUMENTS

| CN | 104025488 A | 9/2014 |
| CN | 107113141 A | 8/2017 |

(Continued)

OTHER PUBLICATIONS

Qualcomm Incorporated: "Signaling and Support of BandCombinations in 4C-HSDPA",3GPP Draft;R2-10381 O_Signalling_Support Band_Combinations, 3rdGeneration Partnership Project (3GPP), Mobilecompetence Centre ; 650, Route Des Lucioles ; F-06921Sophia-Antipolis Cedex ; France,vol. RAN WG2, No. Stockholm, Sweden; Jun. 28, 2010, Jun. 22, 2010(Jun. 22, 2010), XP050451243.

(Continued)

*Primary Examiner* — Kenny S Lin

(57) ABSTRACT

Systems and methods for generating a control signal for automatic wireless network version detection of a transmission. The control signal enables a receiver to detect the wireless network version detection of the transmission, so that the proper wireless network version is used for interpreting signaling information and decoding of the payload of the transmission. In some examples, the control signal is within a preamble of the transmission. The wireless network version can be an IEEE 802.11 version, such as proposed IEEE 802.11be. The control signal is compatible with legacy systems and can indicate the legacy signaling information by way of a Legacy Signal (SIG) (L-SIG) symbol. In some examples, the control signal can indicate the wireless network version by using an identifier symbol which is generated from at least part of, but is not identical to, the L-SIG symbol.

20 Claims, 27 Drawing Sheets

Related U.S. Application Data

No. 16/944,993, filed on Jul. 31, 2020, now Pat. No. 11,387,937.

(60) Provisional application No. 62/884,136, filed on Aug. 7, 2019.

(56) References Cited

U.S. PATENT DOCUMENTS

| | | | |
|---|---|---|---|
| 2010/0260159 A1* | 10/2010 | Zhang | H04W 28/06 370/338 |
| 2011/0149927 A1 | 6/2011 | Stacey et al. | |
| 2013/0136157 A1 | 5/2013 | Son et al. | |
| 2013/0266083 A1 | 10/2013 | Baik et al. | |
| 2014/0348097 A1 | 11/2014 | Park et al. | |
| 2015/0312907 A1 | 10/2015 | Lee et al. | |
| 2016/0066324 A1 | 3/2016 | Li et al. | |
| 2016/0135225 A1 | 5/2016 | Kwon et al. | |
| 2016/0315681 A1 | 10/2016 | Moon | |
| 2017/0111196 A1 | 4/2017 | Su | |
| 2017/0142659 A1 | 5/2017 | Noh et al. | |
| 2017/0207944 A1 | 7/2017 | Zhang | |
| 2017/0208153 A1 | 7/2017 | Li et al. | |
| 2018/0091256 A1 | 3/2018 | Sutskover | |
| 2018/0138959 A1 | 5/2018 | Chun et al. | |
| 2018/0263047 A1 | 9/2018 | Kim et al. | |
| 2018/0359761 A1 | 12/2018 | Chun et al. | |
| 2019/0273768 A1 | 9/2019 | Chun et al. | |
| 2020/0015234 A1 | 1/2020 | Li et al. | |
| 2021/0050914 A1 | 2/2021 | Jang et al. | |
| 2022/0150025 A1* | 5/2022 | Tian | H04W 28/06 |
| 2022/0353049 A1* | 11/2022 | Yang | H04L 5/0039 |

FOREIGN PATENT DOCUMENTS

| | | |
|---|---|---|
| JP | 2017022586 A | 1/2017 |
| JP | 2017059911 A | 3/2023 |
| KR | 20110018823 A | 2/2011 |
| WO | 2016049928 A1 | 4/2016 |
| WO | 2017004836 A1 | 1/2017 |

OTHER PUBLICATIONS

Orange: "TS 29.cde Diameter-based Lh Interface—Diameter applicationfor Lh interface",3GPP Draft; C4-092473_Diameter Application for Lh, 3rdGeneration Partnership Project (3GPP), Mobilecompetence Centre; 650, Route Des Lucioles; F-06921Sophia-Antipolis Cedex; France,No. Seville; Aug. 24, 2009, Aug. 24, 2009 (Aug. 24, 2009), XP050386156.

Geonjung Ko (Wilus) et al., "TB PPDU Format Signaling in Trigger Frame",IEEE 802.11-20/1192r0,Aug. 6, 2022,total:14pages.

Bellalta B. et al., "AP-initiated Multi-User Transmissions in IEEE 802.11axWLANs". Computer Science, Networking and Internet Architecture, Jun. 5, 2018DOI: /10.48550/arXiv. 1702.05397, pp. 1-31.

Ali, M.Z. et al., "Bridging the Transition from IEEE 802.11ac to IEEE 802.11ax:Survival of EDCA in a Coexistence Environment". IEEE Network, Apr. 22, 2019DOI: 10.1109/MNET.2019.1700224, vol. 33, No. 3, pp. 102-107.

* cited by examiner

PREAMBLE WITH DETECTABLE WLAN VERSION IDENTIFICATION

CROSS REFERENCE

This application is a continuation of U.S. patent application Ser. No. 17/862,279 filed Jul. 11, 2022, which is a continuation of U.S. patent application Ser. No. 16/944,993 filed Jul. 31, 2020 which issued as U.S. Pat. No. 11,387,937 on Jul. 12, 2022, which claims the benefit of priority to U.S. Provisional Patent Application No. 62/884,136 filed Aug. 7, 2019, all the entire contents of which are herein incorporated by reference into the Detailed Description herein below.

TECHNICAL FIELD

Example embodiments relate to wireless communications, in particular systems and methods for detecting a wireless local area network (WLAN) version of a transmission.

BACKGROUND

The Institute of Electrical and Electronics Engineers (IEEE) sets standards for wireless communication technologies, including wireless local area network (WLAN) communication technologies. The IEEE 802.11 family of standards relate to WLANs and their quality of service (QoS), access point protocol, security enhancement, wireless management, etc.

There are different wireless network versions of IEEE 802.11. The versions include 802.11a, 802.11g (Extended Rate Physical Layer (PHY), ERP), 802.11n (High Throughput, HT), 802.11ac (Very High Throughput, VHT), and 802.11ax (High Efficiency, HE). There are increasing demands on traffic caused by video streaming, cloud computing, Internet-Of-Things (IOT), big data, Augmented Reality/Virtual Reality (AR/VR), and other factors. New versions of WLAN are being developed to meet the requirements for high transmission data rates. For example, a recent Task Group called "TGbe" in IEEE 802.11 was formed to develop a next generation 802.11 WLAN standard, called IEEE 802.11be (also known as Extremely High Throughput, EHT). IEEE 802.11be has a target of maximum throughput of 30 Gigabits per second (Gbps) with carrier frequency operation between 1 and 7.250 GigaHertz (GHz) while ensuring backward compatibility and coexistence with legacy IEEE 802.11 compliant devices operating in the 2.4 GHz, 5 GHz, and 6 GHz bands.

A wireless communication device is required to know which version of IEEE 802.11 is being used in a communication frame so as to properly interpret or respond to the communication frame. The device can also benefit from knowing what type of frame is being communicated. As well, the frame needs to be compatible with legacy versions along with current versions of IEEE 802.11.

Accordingly, it would be desirable to provide a solution for efficient, backward-compatible, low-error and robust detection of the particular WLAN version of a communication. It would also be desirable to provide a communication format that indicates the type of frame being communicated.

SUMMARY

Example embodiments relate to a control signal that enables automatic detection of a wireless network version (PHY type) of a transmission, so that the wireless network version can be used for interpreting signaling information and decoding of the payload of the transmission. In some example embodiments, the control signal is within a preamble of the transmission. The wireless network version can be an IEEE 802.11 version, such as proposed IEEE 802.11be. The control signal is compatible with legacy systems and can indicate the legacy signaling information by way of a Legacy Signal (SIG) (L-SIG) field.

The receiver can be configured to automatically detect the specific wireless network version of the transmission, which can be a Physical Layer Convergence Procedure (PLCP) Protocol Data Unit (PPDU). The receiver can then correctly conduct further interpretation of signaling information and payload data carried by the PPDU. It is desirable that automatic wireless network version detection be performed at an early stage in the PPDU detection, e.g. after detection of the PPDU packet and performance of frequency channel estimation. The particular wireless network version can then be applied in order to further interpret the signaling information, decode the received payload data, and perform other functions. Example embodiments of PPDU with auto-detection can be applied to the proposed IEEE 802.11be (EHT) as well as other wireless communication versions.

In some wireless communication versions, the indication of data rate in L-SIG is fixed. For example, in IEEE 802.11ax and the proposed IEEE 802.11be the data rate is indicated to be fixed at 6 Megabits per second (Mb/s) in L-SIG. Some example embodiments do not require repeating of rate information because the pre-defined data rate is described in a corresponding SIG field once that particular wireless network version is identified, and therefore the rate is known to the receiver.

An example embodiment is a method for enabling wireless network version detection, performed by a wireless communication device, the method including: generating a control signal for a transmission, the control signal including i) a Legacy Signal (SIG) (L-SIG) symbol and ii) an identifier symbol which is generated from at least part of, but is not identical to, the L-SIG symbol, the identifier symbol indicating a wireless network version of the transmission; and transmitting the control signal.

In another example embodiment of the method, a L-SIG field of the L-SIG symbol includes a Rate subfield and a Length subfield, and wherein an identifier field of the identifier symbol includes a Cyclic Redundancy Check (CRC) subfield in the same corresponding bit positions as the Rate subfield of the L-SIG field, wherein the CRC subfield protects the Rate subfield and the Length subfield, wherein the CRC subfield indicates the wireless network version of the transmission.

In another example embodiment of the method, the method further includes, prior to said transmitting, encoding the CRC subfield with block convolutional code (BCC) encoding.

In another example embodiment of the method, the BCC encoding is code rate one half BCC encoding.

In another example embodiment of the method, the identifier field further includes a Tail subfield, the method further including, prior to said transmitting, encoding the CRC subfield and the Tail subfield with block convolutional code (BCC) encoding.

In another example embodiment of the method, the identifier field includes, prior to said transmitting, encoding the CRC subfield with tail-biting block convolutional code (BCC) encoding.

In another example embodiment of the method, the identifier field includes the Cyclic Redundancy Check (CRC)

subfield repeated at least once in same corresponding bit positions as a Tail subfield of the L-SIG field.

In another example embodiment of the method, an identifier field of the identifier symbol includes a Flag subfield in same corresponding bit positions as a Rate subfield of a L-SIG field of the L-SIG symbol, wherein the Flag subfield indicates the wireless network version of the transmission.

In another example embodiment of the method, the identifier field includes the Flag subfield repeated at least once in same corresponding bit positions as a Tail subfield of the L-SIG

FIELD

In another example embodiment of the method, an identifier field of the identifier symbol is generated by interleaving or scrambling an L-SIG field of the L-SIG symbol with a specified interleaver or a specified scrambling sequence, wherein the interleaved or scrambled L-SIG field indicates the wireless network version of the transmission.

In another example embodiment of the method, the method further includes, prior to said transmitting, performing Inverse Fast Fourier Transform on the control signal over one or more sub-carriers to time domain, wherein the identifier symbol is a cyclic shifted version, in the time domain, of the L-SIG symbol.

In another example embodiment of the method, the transmitting includes transmitting the identifier symbol after the L-SIG symbol.

In another example embodiment of the method, the indicated wireless network version is an Institute of Electrical and Electronics Engineers (IEEE) 802.11 version or an amendment version of the IEEE 802.11 version.

Another example embodiment is a method for enabling wireless network version detection, performed by a wireless communication device, the method including: generating a control signal for a transmission, the control signal including: a Legacy Signal (SIG) (L-SIG) field, a Repeated L-SIG (RL-SIG) field, and an identifier separate from the L-SIG field and the RL-SIG field, the identifier indicating i) a wireless network version of the transmission and ii) a frame type of the transmission; and transmitting the control signal.

In another example embodiment of the method, the indicated wireless network version includes an indication of an amendment version of the indicated wireless network version.

In another example embodiment of the method, the indicated wireless network version is an Institute of Electrical and Electronics Engineers (IEEE) 802.11 version or an amendment version of the IEEE 802.11 version.

In another example embodiment of the method, the indicated frame type is a multi-user (MU) frame type, a single user (SU) frame type, a trigger based (TB) frame type, or an extended range (ER) TB frame type.

In another example embodiment of the method, the identifier is within a signal (SIG) field particular to signaling information of the indicated wireless network version.

In another example embodiment of the method, the control signal is a separate field from a signal (SIG) field particular to signaling information of the indicated wireless network version.

In another example embodiment of the method, the transmission is an uplink transmission, wherein the control signal is within a trigger frame for soliciting the uplink transmission, wherein the identifier is an identifier field or identifier subfield of the trigger frame.

In another example embodiment of the method, bits of the identifier includes shared bits that indicate both i) the wireless network version of the transmission and ii) the frame type of the transmission.

In another example embodiment of the method, the identifier is subsequent to the L-SIG field and the RL-SIG field within the control signal.

In another example embodiment of the method, the method further includes, prior to the transmitting, modulating the identifier as one orthogonal frequency-division multiplexing symbol.

In another example embodiment of the method, the transmitting includes transmitting the identifier field after the L-SIG field and the RL-SIG field.

Another example embodiment is a method for detecting a wireless network version of a transmission, performed by a wireless communication device, the method including: receiving a control signal for a transmission, the control signal including i) a Legacy Signal (SIG) (L-SIG) symbol and ii) an identifier symbol which is generated from at least part of, but is not identical to, the L-SIG symbol, the identifier symbol indicating a wireless network version of the transmission; and interpreting the control signal in accordance with the indicated wireless network version.

Another example embodiment is a method for detecting a wireless network version of a transmission, performed by a wireless communication device, the method including: receiving a control signal for a transmission, the control signal including a Legacy Signal (SIG) (L-SIG) field, a Repeated L-SIG (RL-SIG) field, and an identifier separate from the L-SIG field and the RL-SIG field, the identifier indicating i) a wireless network version of the transmission and ii) a frame type of the transmission; and interpreting the control signal in accordance with the indicated wireless network version.

An example embodiment is a wireless communication device, comprising an antenna; a processing device; and a memory associated with the processing device for storing instructions that when executed by the processing device causes the processing device to perform any of the described methods, processes or functions.

An example embodiment is a non-transitory computer-readable medium which stores instructions that when executed by a processing device causes the processing device to perform any of the described methods, processes or functions.

BRIEF DESCRIPTION OF THE DRAWINGS

For a more complete understanding of the present example embodiments, and the advantages thereof, reference is now made to the following description taken in conjunction with the accompanying drawings, in which.

Similar reference numerals may have been used in different figures to denote similar components.

DETAILED DESCRIPTION

Example embodiments relate to a control signal that enables automatic wireless network version detection of a transmission, so that the wireless network version can be used for interpreting the control signal and the transmission. In some example embodiments, the control signal is within a preamble of the transmission. The wireless network version can be an IEEE 802.11 version, such as proposed IEEE 802.11be. The control signal is compatible with legacy systems and can indicate the legacy signaling information by way of a Legacy Signal (SIG) (L-SIG) field.

Figure 1A:
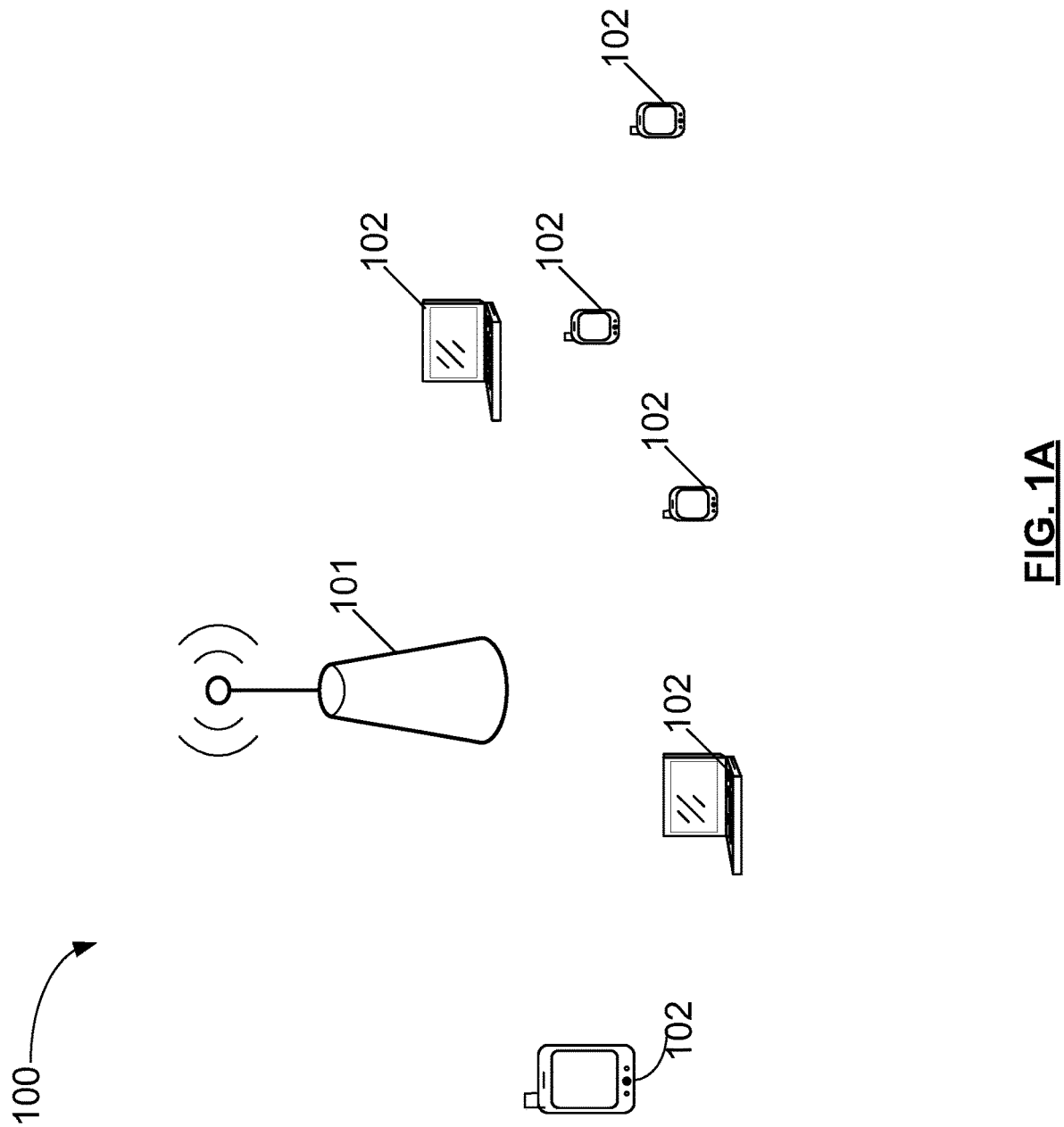
FIG. 1A is a schematic diagram illustrating a wireless communication system for multiple access communications according to an example embodiment.

FIG. 1A provides an example schematic diagram of a wireless communication system 100 in which example embodiments may be implemented. The wireless communication system 100 includes an access point (AP, also known as an AP STA or a network coordinator) 101 and at least one station (STA, also known as non-AP STA) 102 in a wireless communication network, such as a wireless local area network (WLAN). The AP 101 is any entity that has STA functionality and provides access to the Internet or a distribution service for the associated STAs 102. The STAs 102 may be mobile communication devices enabled for wireless communications, including but not limited to mobile phones, smart phones, laptops, tablet computers, machine-type communication devices, Internet of Things (IoT) devices, and wireless sensing and reporting devices. The AP 101 and the STAs 102 can each be configured to execute uplink (UL) and downlink (DL) transmissions in the WLAN.

In the WLAN, the AP 101 may provide access to the Internet or a distribution service for one or more STAs 102 that are wirelessly and communicatively associated with the AP 101. The AP 101 can access the Internet or the distribution service by way of wired or wireless communication. Although only one single AP 101 is shown, this is only illustrative and is not intended to be limiting. In other examples, there may be more than one AP 101 within the wireless communication system 100.

Figure 1B:
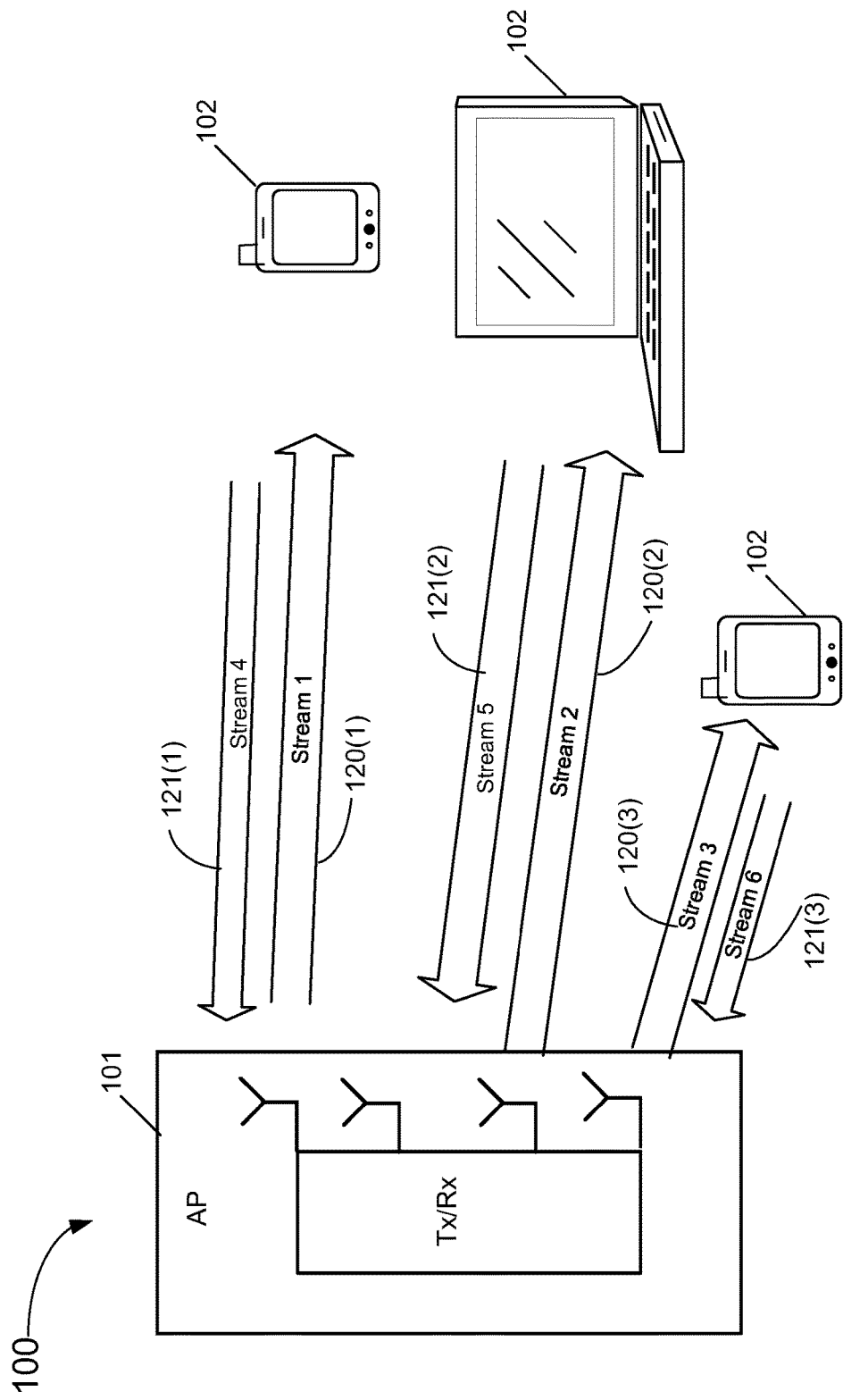
FIG. 1B is a schematic diagram of uplink (UL) and downlink (DL) transmissions of the wireless communication system according to an example embodiment.

Referring to FIG. 1B, examples of the WLAN will be described in the context of wireless communications between a plurality of STAs 102 and an AP 101. The wireless communication system 100 supports multi-user multiple input multiple output (MU-MIMO) transmissions, also known as a multiple access transmissions. The AP 101 and at least one of the STAs 102 may be configured for single user (SU) communications in other examples (not shown here). MU-MIMO based transmission, which can use multiple antennas, allows simultaneous channel access by the STAs 102 for effective use of frequency channels in the WLAN. The AP 101 can simultaneously transmit spatial-multiplexed data to the STAs 102. Payload data can be simultaneously transmitted by the AP 101 to the STAs 102 using a plurality of respective spatial streams (stream 1, 2, 3 shown in FIG. 1B) in the DL direction, shown as DL MU transmissions 120(1) to 120(3) (generically referred to as DL MU transmission 120). In the DL direction, payload data transmitted to each STA 102 may be different for each STA 102. In the UL direction, payload data can be simultaneously transmitted to the AP 101 using a plurality of respective spatial streams (stream 4, 5, 6 shown in FIG. 1B), shown as UL MU transmissions 121(1) to 121(3) (generically referred to as UL MU transmission 121). The DL MU transmissions 120 and the UL MU transmissions 121 are payload transmissions. The DL MU transmissions 120 and the UL MU transmissions 121 may use Orthogonal Frequency Division Multiple Access (OFDMA), with MU-MIMO or without MU-MIMO.

Figure 2:
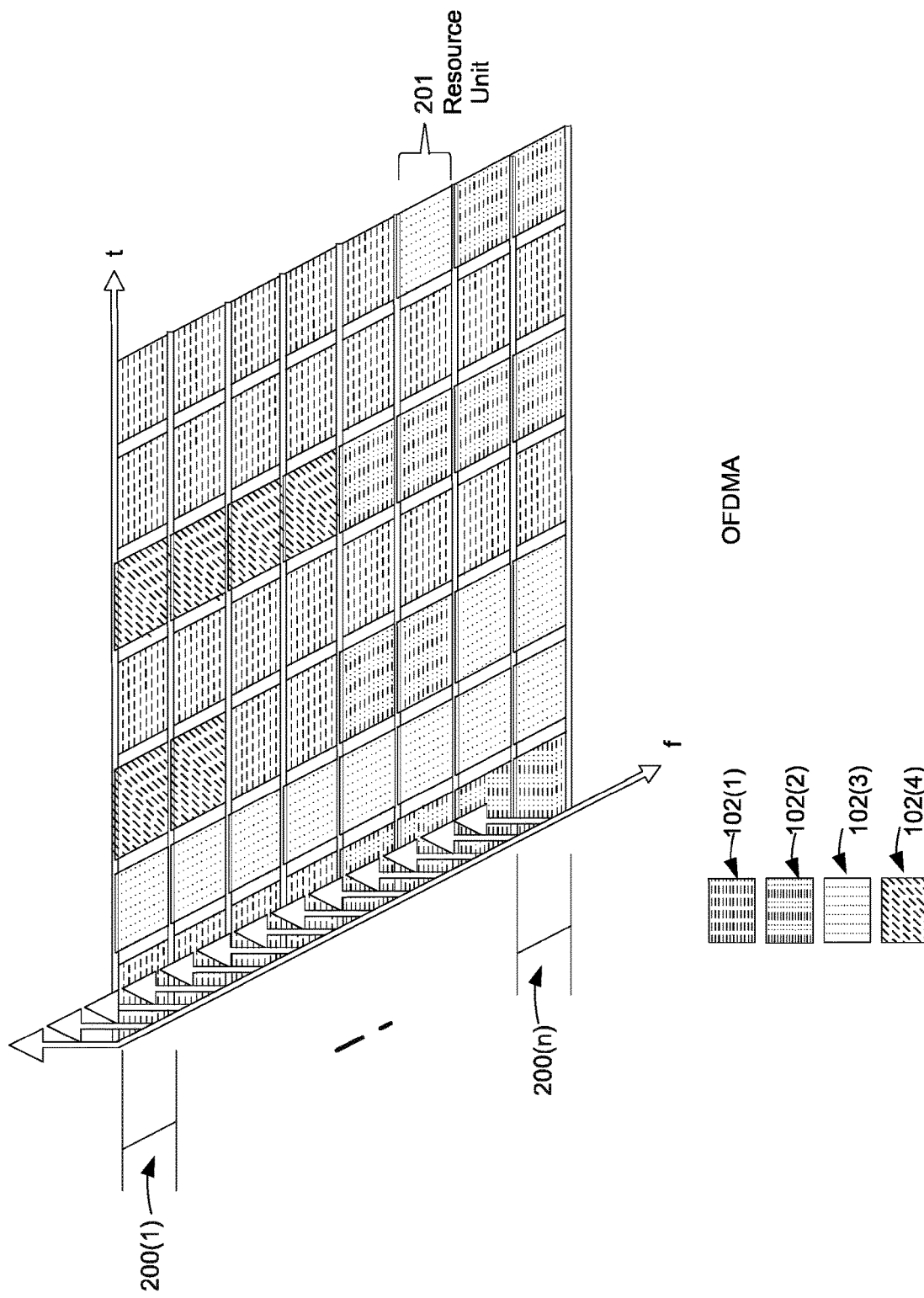
FIG. 2 illustrates a graph of resource units for multiple access communications of the wireless communication system, according to an example embodiments.

Reference is now made to FIG. 2, which illustrates an OFDMA transmission scheme to multiplex communications with a plurality of STAs 102 over different frequencies (f) and times (t). The OFDMA is a multiple access scheme where different subsets of sub-carriers are allocated to different STAs 102, allowing the AP 101 to have data communication with the different STAs 102 (e.g., STAs 102(1) to 102(4) as shown in FIG. 2). The STAs 102 can have data transmission scheduled across both frequency (such as sub-carriers 200(1) to 200(n) (generically referred to as sub-carrier 200) and time. As shown in FIG. 2, transmission frequency channels are divided into smaller sub-channels with a predefined number of sub-carriers. A Resource Unit (RU) 201 includes a plurality of sub-carriers, typically with a minimum size of 26 sub-carriers 200. The RU 201 has a maximum number of sub-carriers that can be used by one or more of the STAs 102. The AP 101 can assign each STA 102 one or more RUs in order to perform a UL or DL transmission, or can assign multiple STAs 102 to a RU.

Figure 3A:
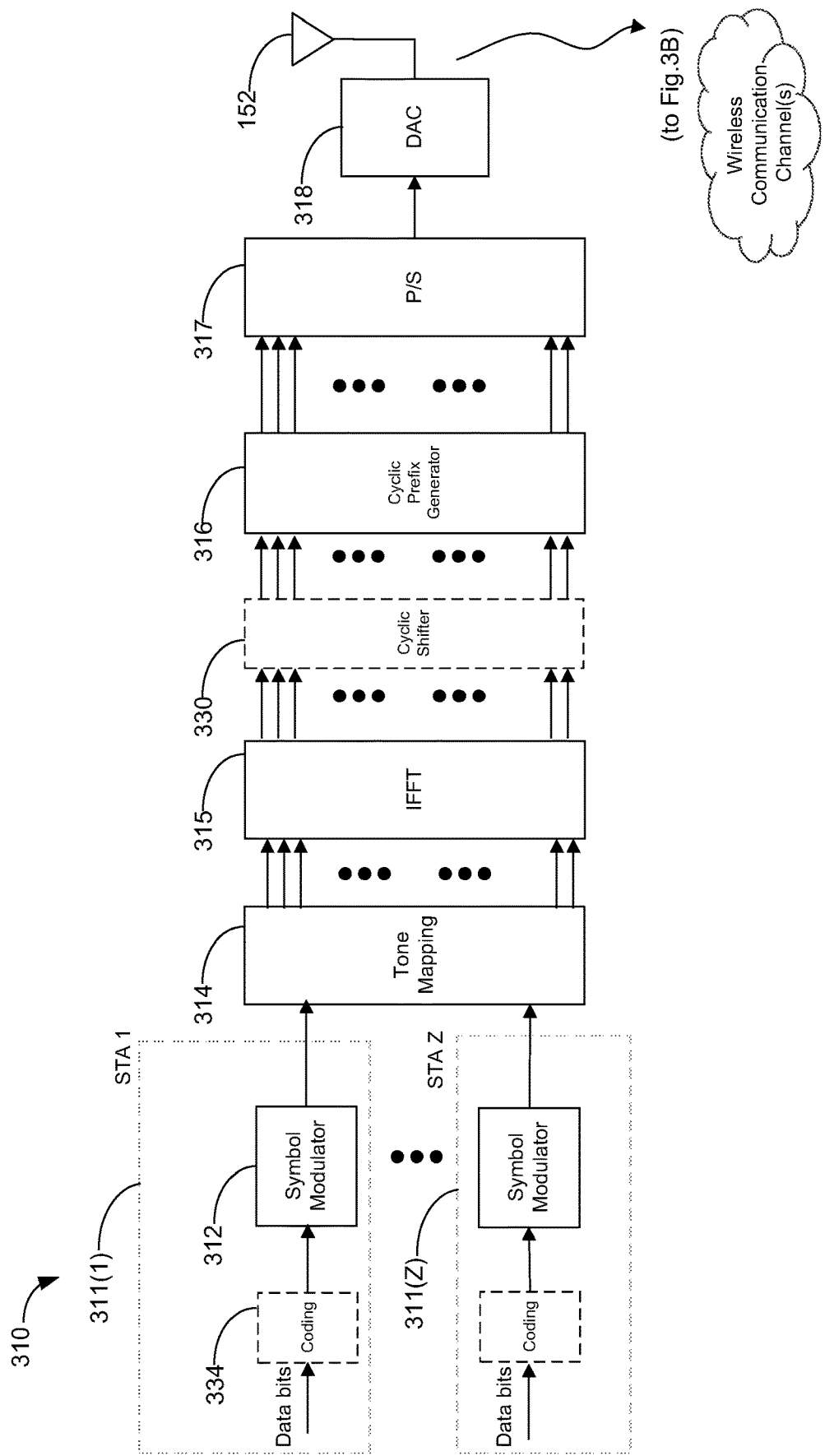
FIG. 3A is a schematic diagram of a transmitter according to an example embodiment.
Figure 3B:
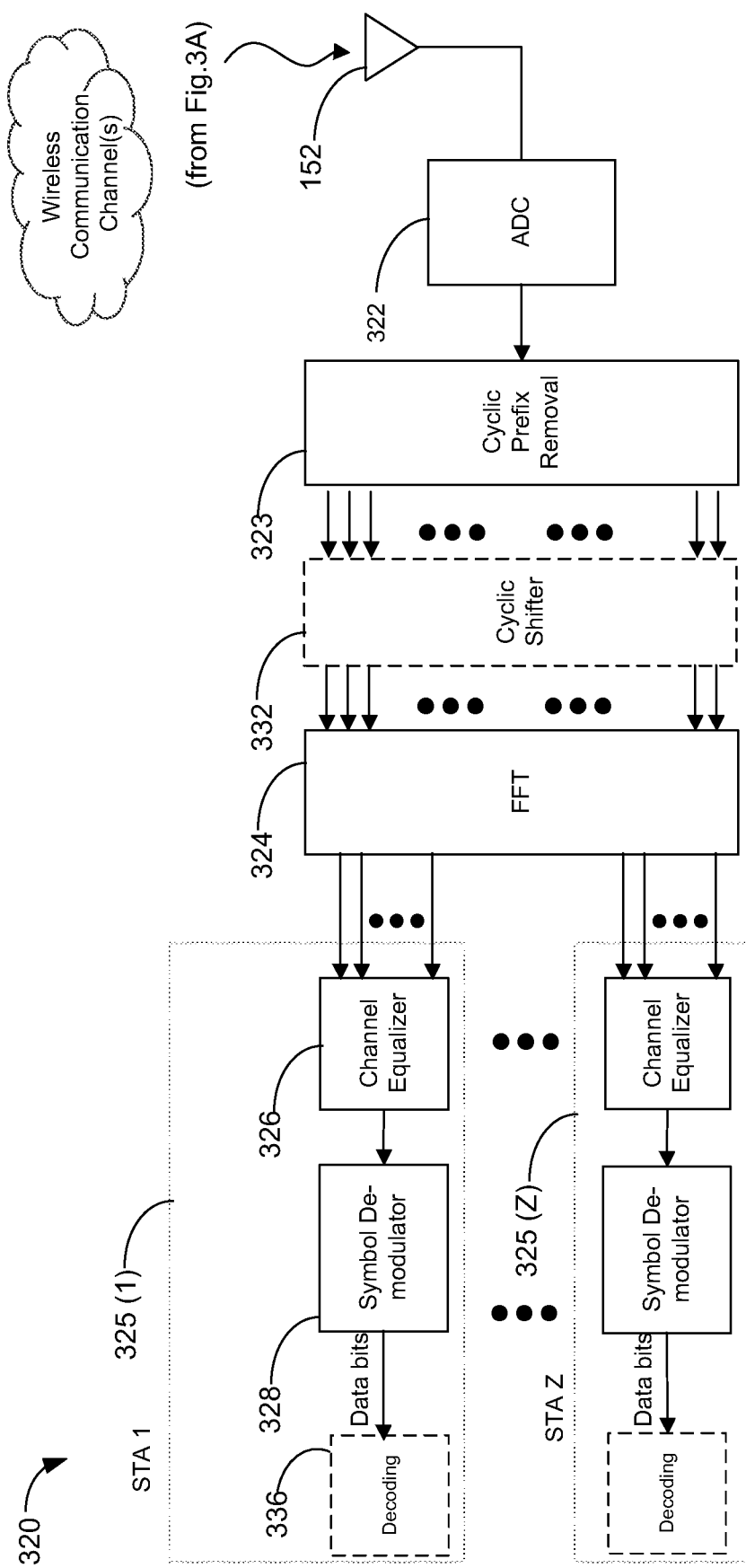
FIG. 3B is a schematic diagram of a receiver according to an example embodiment.

Reference is now made to FIGS. 3A and 3B, wherein FIG. 3A illustrates a transmitter 310 and FIG. 3B illustrates a receiver 320, in accordance with example embodiments. In example embodiments, the transmitter 310 is configured to encode the preamble and payload data of the PPDU, and then transmit the PPDU. The receiver 320 is configured to receive the PPDU, as applicable. In some examples, the receiver 320 first decodes part of the preamble of the received UL or DL PPDU in order to determine a wireless network version of the PPDU, and then the receiver 320 is configured to interpret the preamble and the payload according to the determined wireless network version. In some examples, the transmitter 310 and the receiver 320 are used to communicate trigger frames in order to solicit the UL PPDU.

The transmitter 310 is configured to transmit PPDU. In some examples, the transmitter 310 may be included within the AP 101 or the STA 102 to implement the DL or UL transmission, respectively. For example, in DL direction, the transmitter 310 may be included within the AP 101 to transmit PPDU containing a preamble and respective payload data to STAs 102 on their respective sub-carriers in one or more RUs. In UL direction, the transmitter 310 may be included within an associated STA 102 to transmit preamble and payload data of the STA 102 on its respective sub-carriers in one or more RUs.

As shown in FIG. 3A, the transmitter 310 includes a plurality of transmitting (Tx) paths 311(1) to 311(Z) (generically referred to as Tx path 311) for a transmission that includes a preamble and payload data. When the transmitter 310 is in the AP 101, for DL transmission, the AP 101 can generate Tx paths 311 for different respective STAs (e.g., STA 1 to STA Z).

One Tx path 311 for one STA 102 will now be described in detail. A series of bits are received by the symbol modulator 312 in the Tx path 311. The symbol modulator 312 performs symbol modulation on the bits of the payload data to data symbols (also known as a constellation symbols). The data symbols can be represented as amplitude and phase, or cosine and sine coefficients, or other nomenclatures, as is understood in the art. Each data symbol may be referred to as a chip. The symbol modulation can be based on symbol modulation schemes such as amplitude-shift keying (ASK), phase-shift keying (PSK), binary PSK (BPSK), quadrature PSK (QPSK), quadrature amplitude modulation (QAM), or any other appropriate method of mapping series of data bits to a modulated symbol. The QAM constellations can be specified by cosine and sine coefficients in quadrature.

The tone mapping block 314 maps or assigns each data symbol to one or more of the sub-carriers, known as tone mapping. The data symbols are provided to the Inverse Fast Fourier Transform (IFFT) block 315 to transform the data symbols to the assigned sub-carriers in time domain. Other types of inverse Fourier transforms can be performed in other examples. The output from the IFFT block 315 are OFDMA waveforms in time domain, in parallel for each STA. The cyclic prefix generator 316 adds a cyclic prefix to the OFDMA waveforms. The parallel to serial converter (P/S) 317 converts the parallel OFDMA waveforms of multiple STAs into a serial digital signal. The serial digital signal is converted by a digital-to-analog converter 318 to an analog signal, which is transmitted via an antenna 152. The transmission that is transmitted via the antenna 152 can include the preamble (which can have one or more coded/modulated fields as described in greater detail herein) and the coded/modulated data.

Reference is now made to FIG. 3B, which illustrates a receiver 320 for demodulating each received OFDMA signal in accordance with an example embodiment. In some examples, the receiver 320 may be included within each STA 102 to decode the received OFDMA signal from the DL transmission of the AP 101. In some examples, the receiver 320 may be included within the AP 101 to decode received OFDMA signals from the UL transmission of the STAs 102. As illustrated in FIG. 3B, the receiver 320 includes an antenna 152, an analog-to digital converter (ADC) 322, a cyclic prefix removal block 323, a fast fourier transform (FFT) block 324, and a plurality of receiving (Rx) paths 325(1) to 325(Z) (generically referred to as Rx path 325) on which data is received and the desired data is recovered. For DL transmission, only one receiving path corresponding to one STA 102 needs to be processed by the receiver 320 of the corresponding STA 102. For UL transmission, all of the receiving paths, corresponding to all STAs 102, can be processed by the receiver 320 of the AP 101.

The antenna 152 of the receiver 320 receives analog signals from wireless communication frequency channels, such as from the transmitter 310 as shown in FIG. 3A. The ADC 322 converts each received analog signal into a digital signal. The cyclic prefix removal block 323 removes a cyclic prefix from the digital signal. The FFT block 324 then transforms the cyclic prefix removed digital signal in time domain into data symbols. The data symbols for each STA 102 from the FFT block 324 are processed on a respective one of the plurality of Rx paths. For clarity, one Rx path 325(1) is indicated by a dashed box. One Rx path 325 will now be described in detail. Data symbols are provided to a channel equalizer 326 for equalization, which may help to reduce inter-symbol interference (ISI) and noise effects for better demodulation. The equalized data symbols from the channel equalizer 326 are input to the symbol demodulator 328. The symbol demodulator 328 uses symbol demodulation to demodulate the data symbols into series of bits for the STA 102 to recover the data. The receiver 320 can receive and interpret the preamble of the received signals. When the preamble has one or more coded or modulated fields (as described in greater detail herein), the receiver 320 can be used to decode or demodulate the preamble.

In UL direction, a transmission including a preamble and payload data is transmitted from each associated STA 102 to the AP 101, in response to the STA 102 receiving a trigger frame. The trigger frame can include resource allocation information of one or more RUs for the payload data of each associated STA 102. In some examples, at least one of the fields of the trigger frame is coded by the transmitter 310. After each STA 102 receives the trigger frame, the STA 102 (having the transmitter 310) can transmit a PPDU containing a preamble and payload data of the STA 102 over one or more sub-carriers using the received resource allocation information, and modulate the data symbols over the one or more sub-carriers of the one or more RUs. The AP 101 (having the receiver 320) can receive and interpret the transmission from the STAs, which include a preamble and OFDMA signals of the payload data. When the preamble has one or more coded fields (as described in greater detail herein), the receiver 320 can be used to decode the preamble.

Referring to FIG. 3A, in some examples the transmitter 310 includes a Cyclic Shifter 330, which can be used to perform cyclic shifting, in time domain, on at least part of the preamble or the data payload. The cyclic shifting can be performed after the IFFT block 315 and prior to the Cyclic Prefix Generator 316. Similarly, the receiver 320 can include a Cyclic Shifter 332 for reversing, in time domain and prior to the FFT 324, the cyclic shifting that was performed by the Cyclic Shifter 330 of the transmitter 310. In other example embodiments, there is no Cyclic Shifter 330 or Cyclic Shifter 332.

In some examples, shown in FIG. 3A, the transmitter 310 includes a coding block 334 for coding the data bits, to generate coded data bits that are then input to the symbol modulator 312. Examples of the coding block 334 include block convolutional code (BCC) coding, repeat coding, interleaving, or scrambling. In some examples, shown in FIG. 3B, the receiver 320 includes a decoding block 336 for decoding any coded data bits after the symbol de-modulator block 328, to generate the original data bits. The decoding block 336 can include BCC decoding, repeat decoding, deinterleaving, or descrambling. In other example embodiments, there is no coding block 334 or decoding block 336.

Example embodiments relate to a control signal that enables automatic wireless network version detection of a transmission, so that the wireless network version can be used for interpreting signaling information of the transmission and decoding of the payload of the transmission. In some example embodiments, the control signal is within a preamble of the transmission. The wireless network version can be an IEEE 802.11 version, such as proposed IEEE 802.11be. The control signal is compatible with legacy systems and can indicate the legacy signaling information by way of a Legacy Signal (SIG) (L-SIG) field.

Some examples of legacy signaling from earlier versions of IEEE 802.11 will now be described in greater detail. The legacy signaling can be included into the control signal (e.g., the preamble) of example embodiments, so as to be backwards compatible.

Figure 4A:
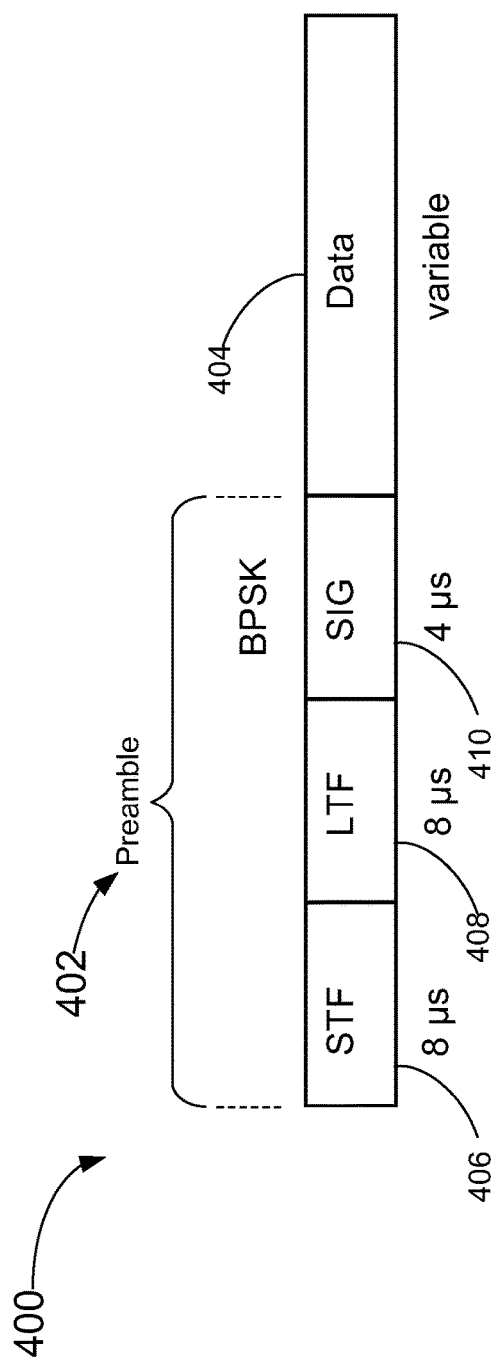
FIG. 4A illustrates an Orthogonal Frequency-Division Multiplexing (OFDM) Physical Layer Convergence Procedure (PLCP) Protocol Data Unit (PPDU) according to IEEE 802.11a or IEEE 802.11g (generically "802.11a/g")

FIG. 4A illustrates an Orthogonal Frequency-Division Multiplexing (OFDM) Physical Layer Convergence Procedure (PLCP) Protocol Data Unit (PPDU) 400 according to IEEE 802.11a/g. Information specified in each field is in the frequency domain. In IEEE 802.11a/g, OFDM modulation is applied to the desired signal over the sub-carrier signals by taking a 64-point IFFT over 20 MHz bandwidth (sub-carrier spacing 312.5 kHz) to generate one OFDM symbol in the time domain with a guard interval added as a cyclic prefix. The duration of each OFDM symbol is 4 microseconds (μs).

The PPDU 400 in FIG. 4A includes a Preamble 402 and a Data field 404. The Data field 404 is the payload data. The Preamble 402 includes Short Training field (STF) 406, Long Training field (LTF) 408, and Signaling (SIG) field 410, all of which are defined by the IEEE 802.11a PPDU format.

The STF 406 is for signal detection, Automatic Gain Control (AGC), discovery selection, coarse frequency offset estimation, and timing synchronization. The STF 406 includes two OFDM symbols.

The LTF 408 is for more accurate timing synchronization, more accurate estimate of frequency offset, and frequency channel estimation. The LTF 408 includes two OFDM symbols.

The SIG field 410 is an indication of the length and transmission rate of the PHY service data unit (PSDU). The SIG field 410 is coded with code rate 1/2 block convolutional code (BCC) and is modulated using BPSK modulation. One OFDM symbol is used for transmission of the SIG field 410.

Figure 4B:
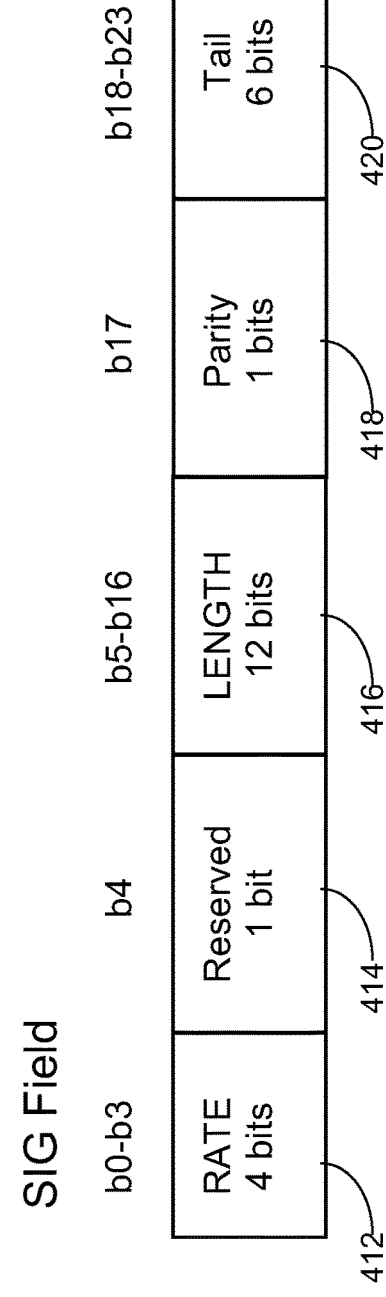
FIG. 4B illustrates a signal (SIG) field of the OFDM PPDU of FIG. 4A according to IEEE 802.11a/g.

FIG. 4B illustrates the SIG field 410 of the OFDM PPDU 400 of FIG. 4A according to IEEE 802.11a. As shown in FIG. 4B, the SIG field 410 includes total 24 bits, as follows (bit positions are denoted with "b").

Rate subfield 412 (b0-b3) represents transmission rate in the 20 MHz bandwidth.

Reserved subfield 414 (b4) is reserved. It shall be set to 0 on transmit and ignored on receive.

Length subfield 416 (b5-b16) is a 12-bit integer that indicates the PSDU length in octets.

Parity subfield 418 (b17) is a positive parity (even parity) bit for bits 0-16.

Tail subfield 420 (b18-b23) refers to tail bits, set to all zeros, to terminate the state of the BCC and used for the SIG field 410 encoding.

Figure 4C:
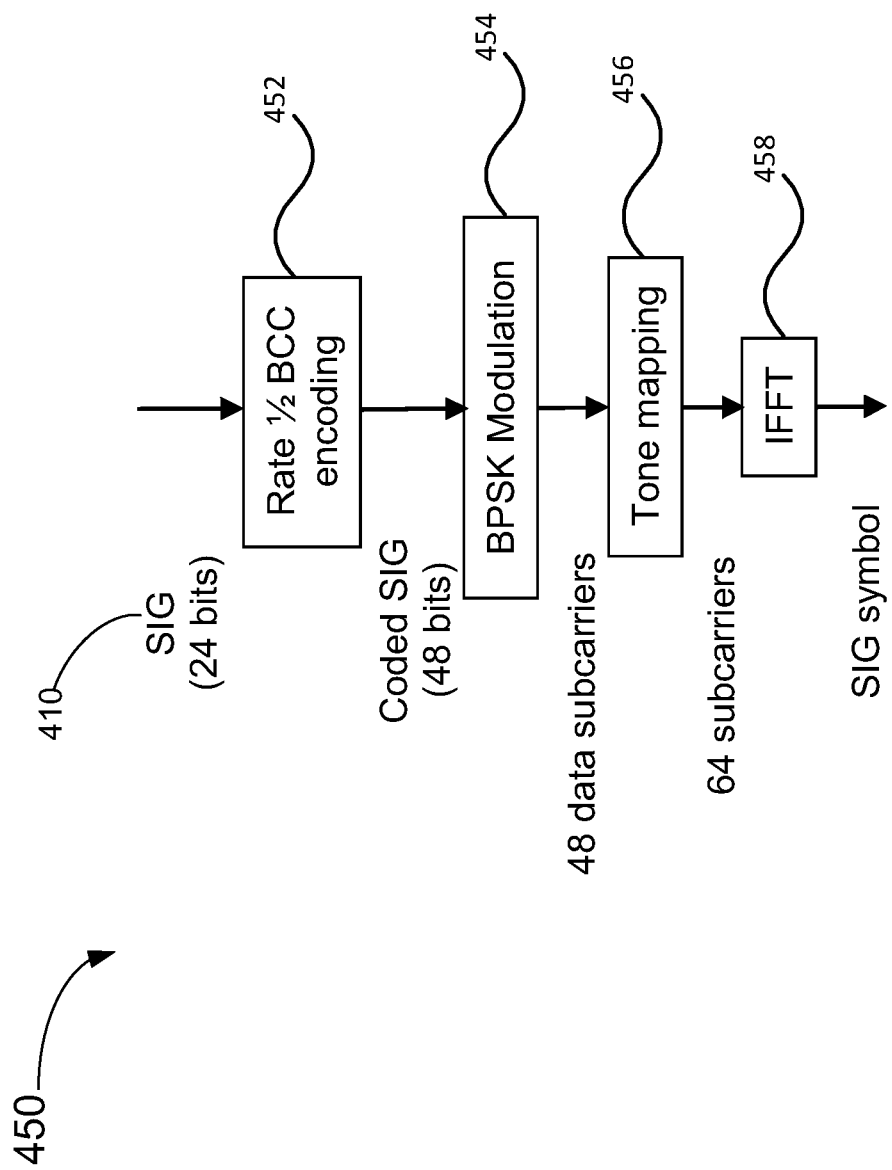
FIG. 4C illustrates an example method of encoding and modulation the SIG field of FIG. 4B according to IEEE 802.11a/g.

FIG. 4C illustrates a method 450 of encoding the SIG field 410 of FIG. 4B according to IEEE 802.11a/g. The method 450 can be performed by the transmitter 310. The SIG field 410 has 24 bits. At step 452, the transmitter 310 encodes the SIG field 410 with code rate 1/2 block convolutional code (BCC), to a coded SIG of 48 bits. At step 454, the symbol modulator 312 of the transmitter 310 modulates the coded SIG using BPSK modulation to 48 data sub-carriers. At step 456, the tone mapping block 314 of the transmitter 310 performs tone mapping of the BPSK modulated SIG over 64 sub-carriers. At step 458, the IFFT block 315 of the transmitter 310 then applies OFDM modulation over the 64 sub-carrier signals in accordance with the tone mapping, by taking a 64-point IFFT, arriving at a SIG symbol.

The detection of the IEEE 802.11a/g PPDU 400 includes detecting transmitted signal strength in the Preamble 402 and a check on the single bit of the Parity subfield 418 in the SIG field 410. The Rate subfield 412 in the SIG field 410 can be used differentiate between an IEEE 802.11g PPDU and an IEEE 802.11a PPDU.

Continuing through the IEEE 802.11 standard versions, other example indicators for automatic detection of wireless network type are defined by IEEE 802.11n (HT-mixed) and IEEE 802.11ac (VHT), not shown here.

Figure 5:
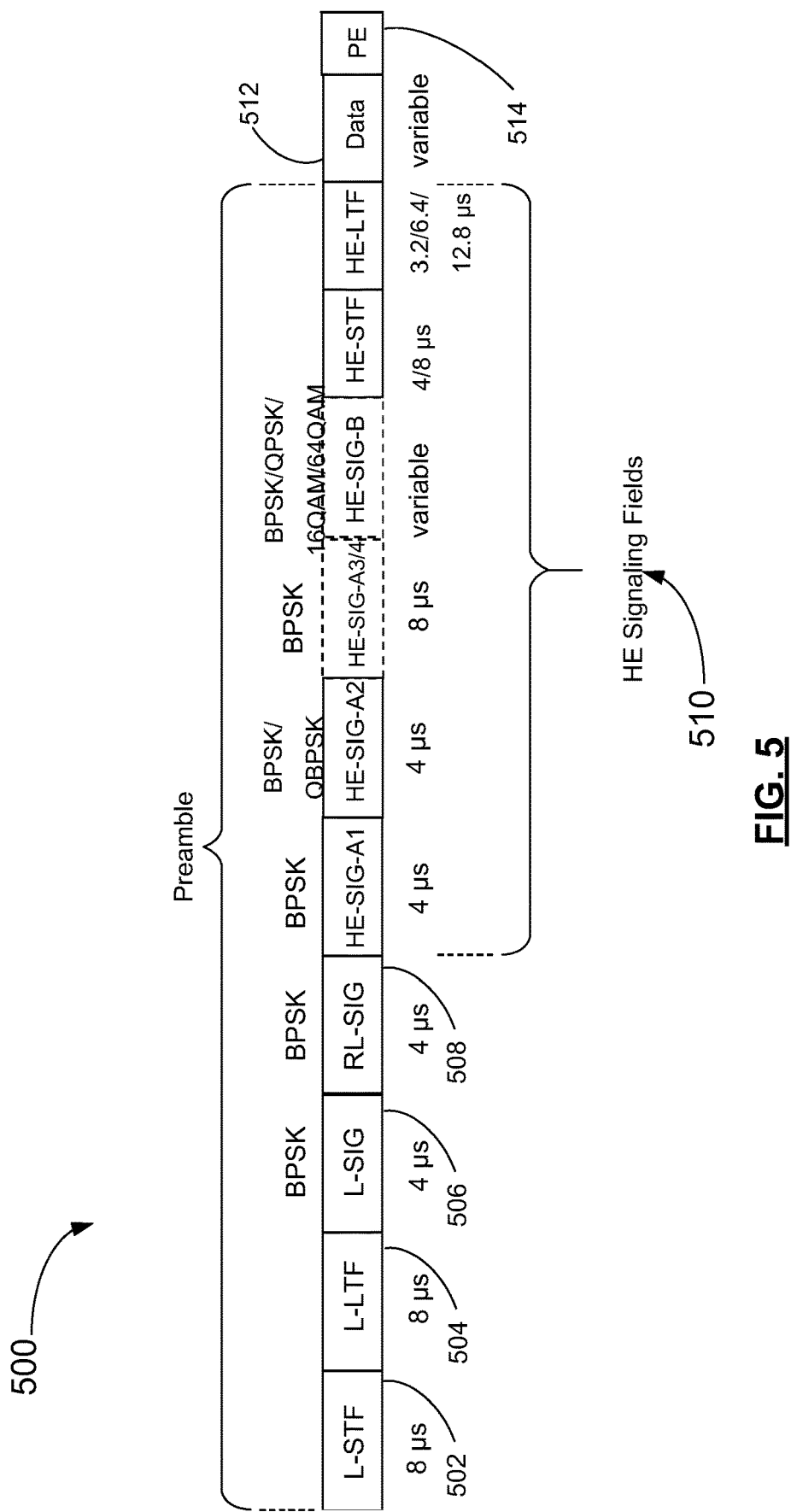
FIG. 5 illustrates an OFDM High Efficiency (HE) PPDU according to IEEE 802.11ax.

For IEEE 802.11ax, FIG. 5 illustrates an OFDM High Efficiency (HE) PPDU 500 according to IEEE 802.11ax. The prefix "L" indicates Legacy. The L-STF subfield 502 and L-LTF subfield 504 are the same as defined by IEEE 802.11a in the legacy OFDM PPDU 400 (FIG. 4A). The PPDU 500 also includes a L-SIG field 506, a Repeated L-SIG field 508, HE Signaling fields 510, Data 512, and Packet Extension (PE) 514.

The L-SIG field 506 follows the same format as the SIG field 410 shown in FIG. 4B, the Rate subfield 412 is set to 6 Mb/s (i.e., bit positions b0b1b2b3="1101" to represent 6 Mb/s); the Length subfield 416 is set to be a value which is not divisible by 3; the Reserved subfield 414 is set to 0; the Parity subfield 418 is set to even parity of bits 0-16 and the Tail subfield 420 is set to 0.

The RL-SIG field 508 in the PPDU 500 is a repeat of the L-SIG field 506 and is used in IEEE 802.11ax to distinguish the HE PPDU 500 from a non-HT PPDU, HT PPDU and VHT PPDU.

In IEEE 802.11ax, automatic detection of the wireless network version of the HE PPDU 500 is performed based on at least detection of repetition between L-SIG symbol carrying L-SIG field 506 and RL-SIG symbol carrying RL-SIG field 508 and decoding of Rate subfield 412 and Length subfield 416 information in L-SIG field 506. The procedure for automatic detection of HE PPDU 500 for an HE receiver (e.g., using receiver 320) is as follows:

Firstly: Detect the first symbol after L-LTF subfield 504. Determine whether Quadrature Binary Phase Shift Keying (QBPSK) is used in this symbol. If the first symbol after L-LTF subfield 504 is BPSK modulated, detect the RL-SIG field 508;

Secondly: Detect the second symbol after L-LTF and determine whether the first and second symbols after L-LTF subfield 504 are the same. If detection of L-SIG field 506 repetition fails, detect SIG for non-HT, HT and VHT and determine preamble types. If repetition of L-SIG field 506 is detected in the RL-SIG field 508, the receiver 320 combines the L-SIG symbol carrying L-SIG field 506 and the RL-SIG symbol carrying RL-SIG field 508, decodes the combined signals, checks the Parity subfield 418 and determine whether Rate subfield 412 is set to 6 Mbps. If Parity subfield 418 or Rate subfield 412 check fails, determine preamble types for non-HT, HT or VHT. If Parity subfield 418 and Rate subfield 412 are valid, the receiver 320 evaluates the Length subfield 416 in L-SIG field 506.

Thirdly: Determine, from the Length subfield 416, Length mod 3. If Length mod 3 equals 0, detect SIG for non-HT, HT and VHT and determine preamble types; if Length mod 3 equals 1, detect HE-SIG-A and determine the HE PPDU mode.

Having described some existing IEEE standards for automatic detection of the wireless network version, example embodiments for automatic detection of a wireless network version will now be described. Example embodiments include the generating of a control signal, such as the preamble or the trigger frame, for a transmission. In some examples, the preamble is an EHT preamble of proposed IEEE 802.11be. The automatic detection of wireless network version type of the PPDU can be achieved with an identifier, which can be an identifier symbol, an identifier field or subfield, or other types of identifiers. The identifier symbol can be defined by the identifier field or subfield, or by the encoding or modulation performed on the identifier field or subfield to arrive at the identifier symbol. In some examples, an identifier symbol is generated from at least part of, but is not identical to, the L-SIG symbol. In other examples, an identifier field or subfield is separate from the L-SIG field and the RL-SIG field.

Figure 6:
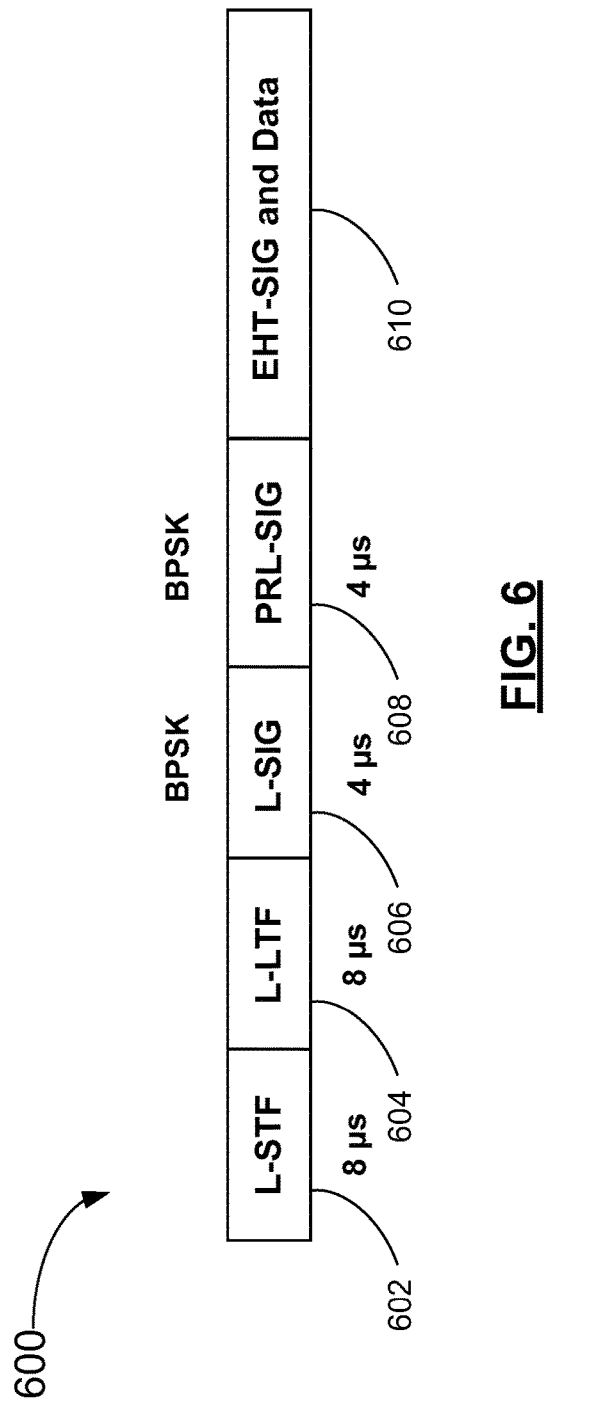
FIG. 6 illustrates an example of an OFDM PPDU having auto-detectable wireless network version indication using a Partial Repeated Legacy Signal (SIG) (PRL-SIG) field, in accordance with an example embodiment.

FIG. 6 illustrates an example of an OFDM PPDU 600 having auto-detectable wireless network version indication, in accordance with an example embodiment. The PPDU 600 includes an identifier field which is different than the RL-SIG, denoted Partial Repeated Legacy Signal (SIG) (PRL-SIG) field 608. The L-STF subfield 602 and L-LTF subfield 604 are the same as defined by IEEE 802.11a in the legacy OFDM PPDU 400 (FIG. 4A). The PPDU 600 can include a SIG field particular to signaling information of the indicated wireless network version, such as EHT-SIG in this example. The EHT-SIG and the payload data are collectively referred to as EHT-SIG and Data 610.

In IEEE 802.11ax, RL-SIG is a fully repeated version of L-SIG 606 including Rate (which is set to "1101" to indicate a fixed code rate of 6 Mbps), Parity and Length which are used jointly for automatic detection IEEE 802.11ax. The Length is also used for calculation of the number of OFDM symbols in the data transmission in the PPDU. FIG. 6 illustrates, instead of the RL-SIG field of IEEE 802.11ax, a different indicator denoted partial RL-SIG (PRL-SIG) field 608.

In the example PPDU 600 of FIG. 6, using the same definition as in IEEE 802.11ax, the Rate in the L-SIG is also set to "1101" to indicate a fixed code rate of 6 Mbps. In IEEE 802.11ax, a single Parity bit in the SIG may be used for error detection, but can cause an error detection problem in lower signal-to-noise (SNR) conditions. The Rate subfield is set to a known value in the L-SIG in IEEE 802.11ax, and is known by the receiver 320 to be 6 Mbps once the wireless network version is known.

In the PPDU 600, at least Cyclic Redundancy Check (CRC) is used for the error detection. In the PRL-SIG field 608, the CRC is at the same corresponding subfield location (bit positions) as the Rate subfield defined in L-SIG 606. The bits in the remaining subfields defined in L-SIG 606 are repeated or partially repeated in the PRL-SIG field 608. In some examples, some bits of the remaining subfields defined in L-SIG 606 are different in the PRL-SIG field 608.

In an example embodiment, automatic detection of the PPDU 600 of FIG. 6 is conducted based on a CRC check, or in other examples, a combination of the CRC check plus a Parity check. In some examples, the PRL-SIG field 608 of FIG. 6 is modulated by the symbol modulator 312 using BPSK modulation. Automatic detection can further be conducted by recognition of the PRL-SIG field 608 as being modulated using BPSK modulation.

Figure 7:
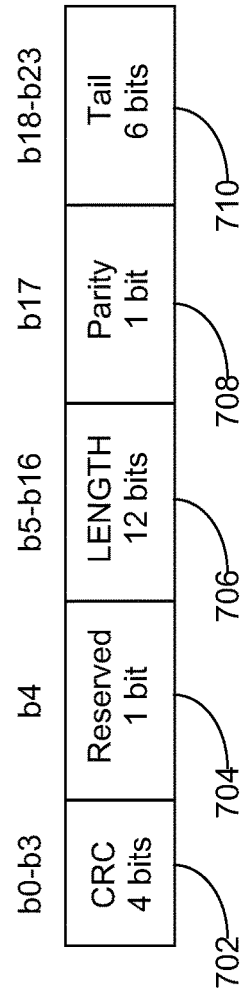
FIG. 7 illustrates an example embodiment of the PRL-SIG field shown in FIG. 6, including a Cyclic Redundancy Check (CRC) subfield.

FIG. 7 illustrates an example embodiment of the PRL-SIG field 700, introduced in FIG. 6 as PRL-SIG field 608. The PRL-SIG field 700 is an identifier field for automatic detection of the wireless network version. In the PRL-SIG field 700 of FIG. 7, the subfields include the CRC subfield 702, Reserved (R) subfield 704, Length subfield 706, Parity (P) subfield 708, and Tail subfield 710. In this example embodiment of the PRL-SIG field 700, the 4 CRC bits and 6 Tail bits can be coded together using a code rate 1/2 BCC encoder, which is the same type of BCC encoder as used for L-SIG 606. The CRC in the CRC subfield 702 protects the Rate (i.e., bit positions b0-b3) and Length (i.e., b5-b16) in the L-SIG 606.

Figure 8:
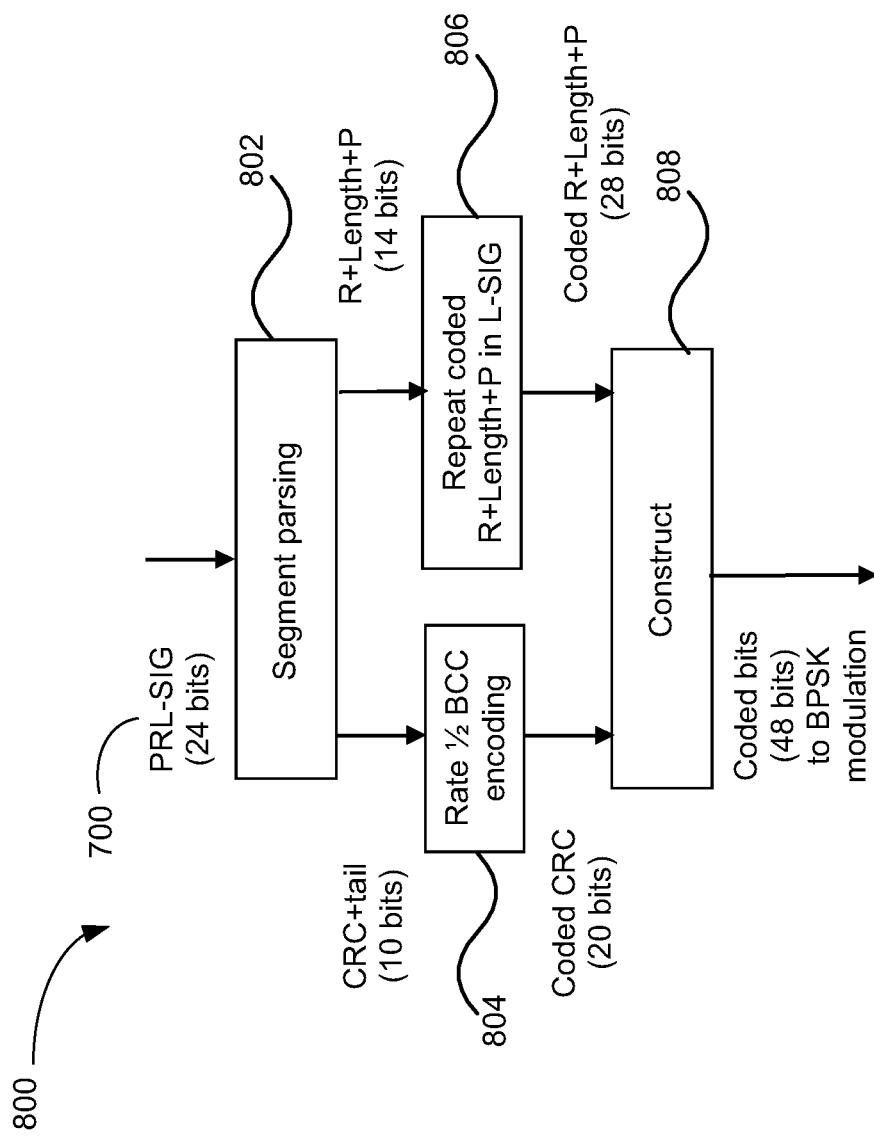
FIG. 8 illustrates an example method of encoding the PRL-SIG field of FIG. 7.

FIG. 8 illustrates an example method 800 of encoding the PRL-SIG field 700 of FIG. 7. In an example embodiment, the method 800 can be performed by the transmitter 310 (FIG. 3A). At step 802, the transmitter 310 performs segment parsing of the PRL-SIG field 700 to a first group of bits and a second group of bits. The first group of bits is the CRC subfield 702 and Tail subfield 710, and the second group of bits is the Reserved (R) subfield 704, Length subfield 706, and Parity (P) subfield 708. At step 804, the transmitter 310 encodes the CRC and Tail using a code rate 1/2 BCC encoder. At step 806, the transmitter 310 duplicates the coded Reserved, Length, and Parity bits generated in L-SIG. At step 808, the transmitter 310 constructs together the coded bits from the first group of bits and the second group of bits and sends the constructed coded bits to the symbol modulator 312 (FIG. 3A) for BPSK modulation.

Figure 9:
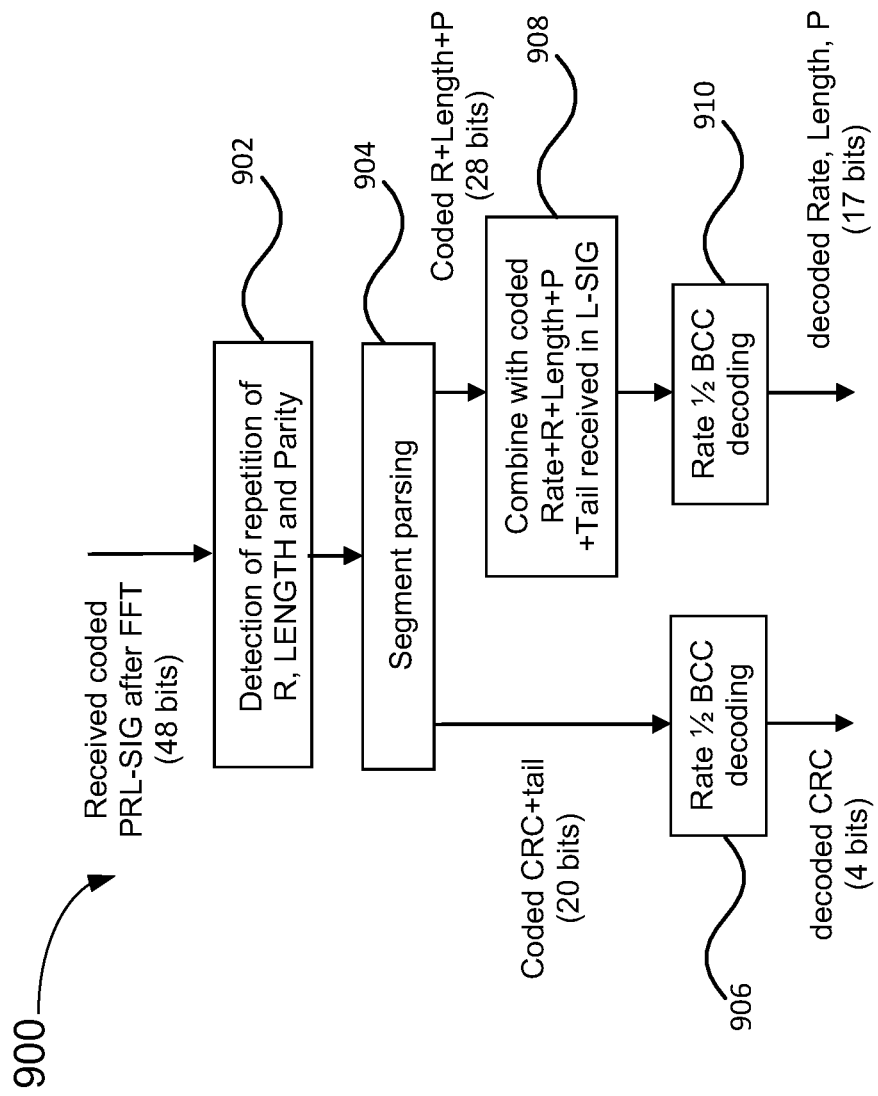
FIG. 9 illustrates an example method of detecting the PRL-SIG field from the signal generated by the method of FIG. 8.

FIG. 9 illustrates an example method 900 of detection of the PRL-SIG field 700 from the signal generated by the method 800 of FIG. 8. At the receiver 320, a signal (PPDU) in time domain is received and the FFT block 324 of the receiver 320 performs Fast Fourier Transform to recover coded bits of the PRL-SIG field 700. At step 902, the receiver 320 detects the repetition of Reserved (R) subfield 704, Length subfield 706, and Parity (P) subfield 708 from the PRL-SIG field 700, by comparing with the corresponding coded bits in L-SIG. At step 904, the receiver 320 performs segment parsing of the received coded PRL-SIG to a first group of bits and a second group of bits. The first group of bits is the coded CRC subfield 702 and Tail subfield 710 and the second group of bits is the coded Reserved subfield 704, Length subfield 706, and Parity subfield 708. At step 906, the receiver 320 performs code rate 1/2 BCC decoding on the first group of bits to generate the decoded bits of the CRC. At step 908, the receiver 320 combines the second group of bits with coded L-SIG subfields Rate, Reserved, Length, Parity, and Tail, the combination of which at step 910 is decoded using code rate 1/2 BCC decoding to generate the decoded bits of Rate, Length and Parity.

In an example, the receiver 320 can conduct a CRC check, using the decoded bits of CRC, onto the protected Rate and Length subfields (decoded from the L-SIG and the PRL-SIG). If the CRC check passes, the receiver determines the PPDU to be a specified wireless network version, such as IEEE 802.11be. In other examples, the check is a combination of a CRC check, and a Parity check with the L-SIG.

Figure 10:
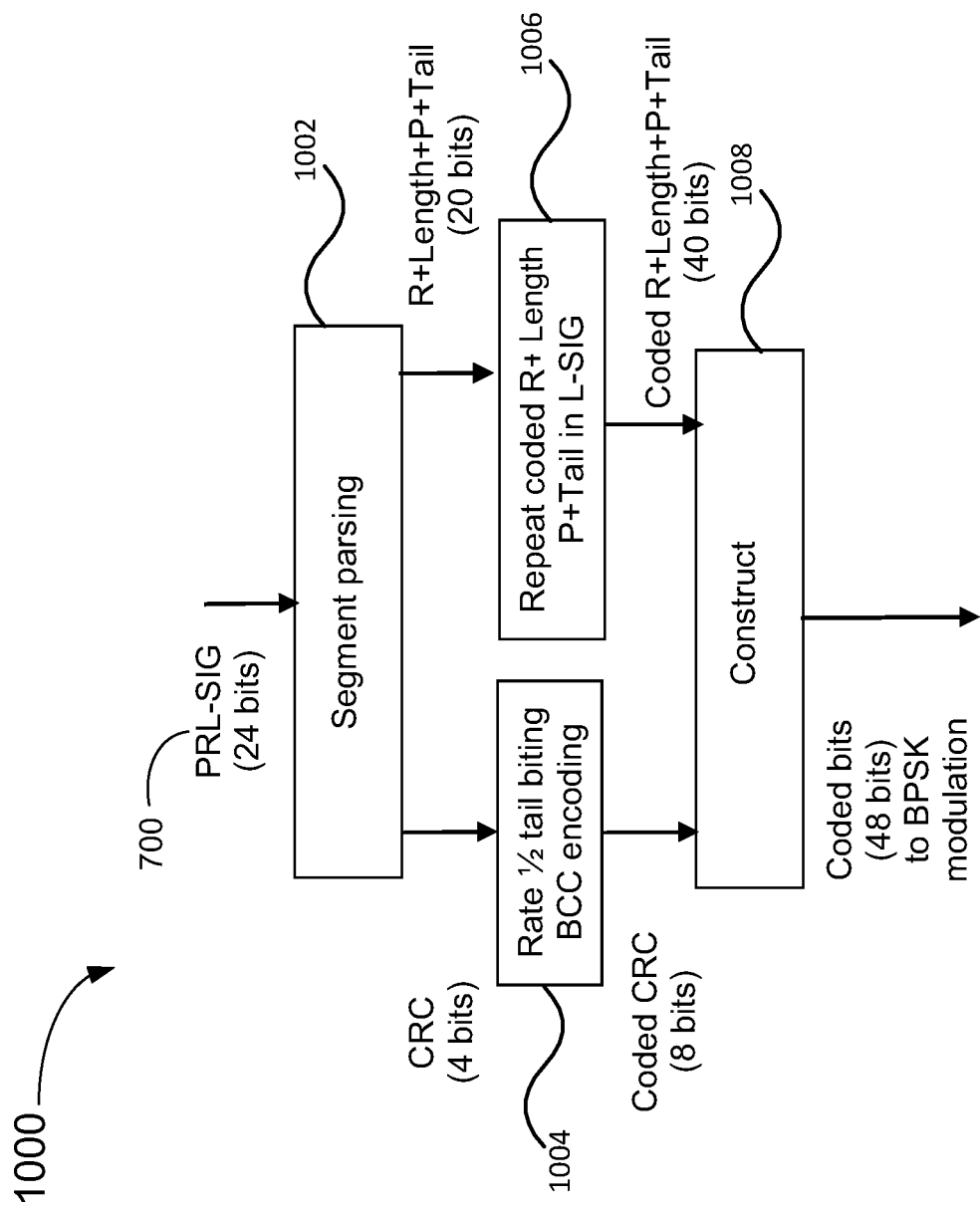
FIG. 10 illustrates another example method of encoding the PRL-SIG field of FIG. 7.

FIG. 10 illustrates another example method 1000 of encoding the PRL-SIG field 700 of FIG. 7. The format of the PRL-SIG field 700 in this example is the same as shown in FIG. 7. However, in the method 1000 of FIG. 10, the encoding for the CRC is different than in FIG. 8. In the method 1000, the CRC bits are coded by coding block 334 with a code rate 1/2 tail biting BCC encoder. The tail biting BCC encoder does not use the tail bits of the Tail subfield 710 (FIG. 7). The CRC protects the Rate (i.e., bit positions b0-b3) and Length (i.e., b5-b16) of the L-SIG.

In the method 1000 of FIG. 10, at step 1002 the transmitter 310 performs segment parsing of the PRL-SIG field 700 to a first group of bits and a second group of bits. The first group of bits is the CRC subfield 702, and the second group of bits is the Reserved subfield 704, Length subfield 706, Parity subfield 708, and Tail subfield 710. At step 1004, the transmitter 310 encodes the CRC with the tail biting BCC encoder, which does not use the Tail bits. At step 1006, the transmitter 310 duplicates the coded Reserved, Length, Parity, and Tail generated in L-SIG. At step 1008, the transmitter 310 constructs together the coded bits from the first group of bits and the second group of bits and sends the constructed 48 coded bits to the symbol modulator 312 (FIG. 3A) for BPSK modulation.

Figure 11:
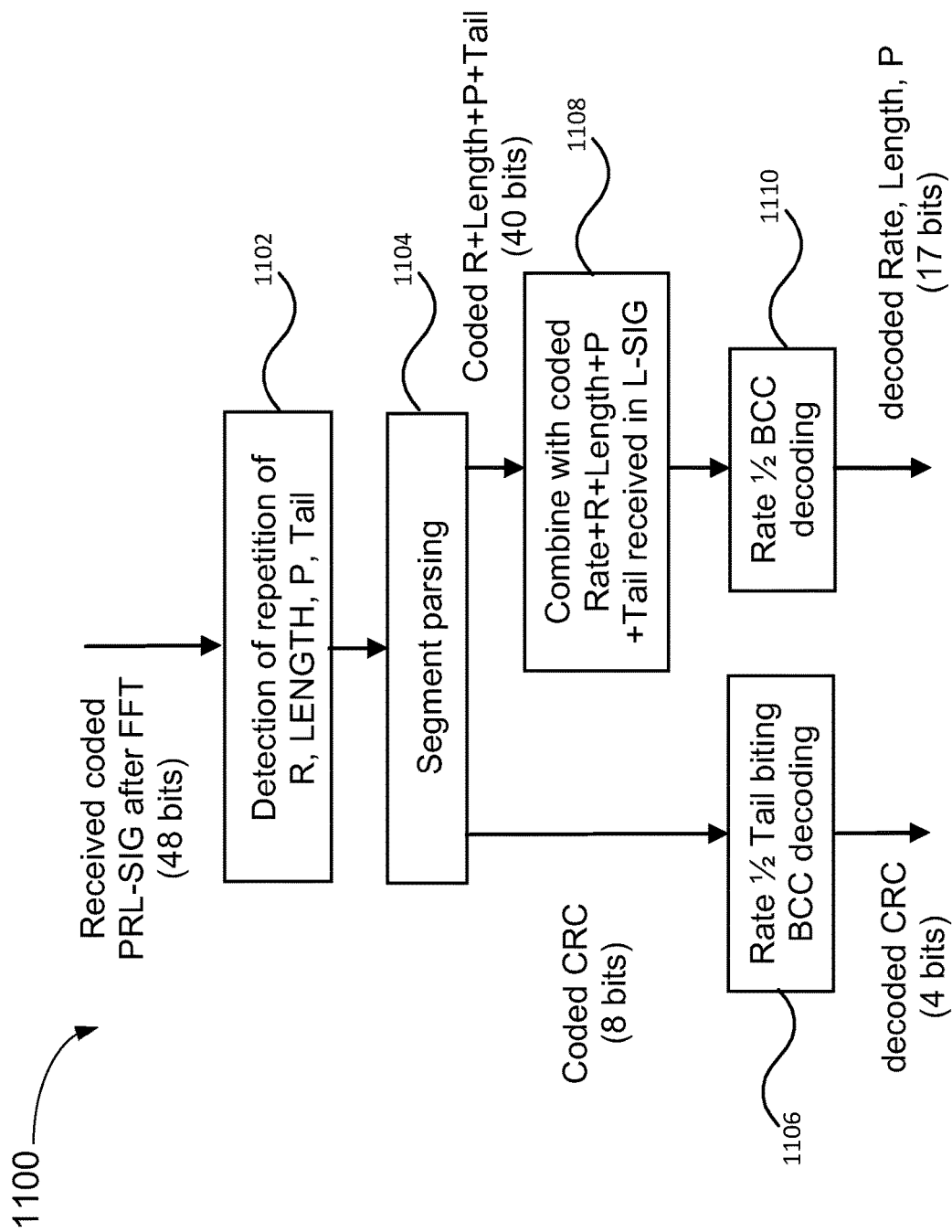
FIG. 11 illustrates an example method of detecting the PRL-SIG field from the signal generated by the method of FIG. 10.

FIG. 11 illustrates an example method 1100 of detecting the coded PRL-SIG field 700 from the signal generated by the method 1000 of FIG. 10. Generally, the receiver 320 can perform detection of the CRC in the PRL-SIG field 700 and the Length and Parity in both the L-SIG and PRL-SIG. At the receiver 320, a signal (PPDU) in time domain is received and the FFT block 324 of the receiver 320 performs Fast Fourier Transform to recover coded bits of the PRL-SIG field 700. At step 1102, the receiver 320 detects the repetition of Reserved, Length, Parity and Tail in the coded bits of the PRL-SIG field 700. At step 1104, the receiver 320 performs segment parsing of the received coded PRL-SIG field 700 to a first group of bits and a second group of bits. The first group of bits is the coded CRC subfield 702 and a second group of bits is the coded Reserved, Length, Parity and Tail. At step 1106, the receiver 320 performs code rate 1/2 tail biting BCC decoding on the first group of bits to generate the decoded bits of the CRC. At step 1108, the receiver 320 combines the second group of bits with coded L-SIG subfields Rate, Reserved, Length, Parity, and Tail, the combination of which at step 1110 is decoded using code rate 1/2 BCC decoding to generate the decoded bits of Rate, Length and Parity.

In an example, the receiver 320 can conduct a CRC check onto the protected Rate and Length subfields (from the L-SIG and/or the PRL-SIG). If the CRC check passes, the receiver 320 determines the PPDU to be a specified wireless network version, such as IEEE 802.11be. In other examples, the check is a combination of the CRC check, and a Parity check with the L-SIG.

Figure 12:
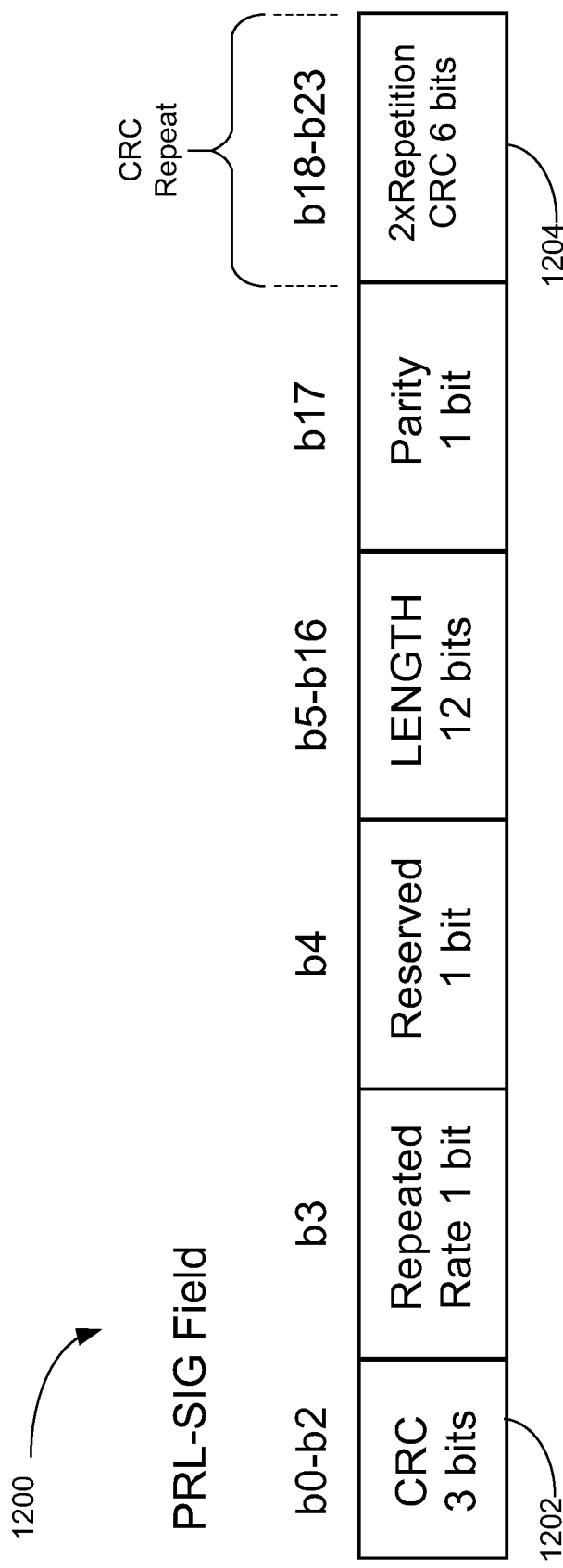
FIG. 12 illustrates a second example embodiment of the PRL-SIG field shown in FIG. 6, which includes the Cyclic Redundancy Check (CRC)

FIG. 12 illustrates a second example embodiment of the PRL-SIG field 1200, introduced in FIG. 6 as PRL-SIG field 608, and includes the Cyclic Redundancy Check (CRC). The PRL-SIG field 1200 is an identifier field for automatic detection of the wireless network version. In this example, the subfields in the PRL-SIG field 1200 include a 3-bit CRC subfield 1202 which protects the Length subfield, i.e., bit positions b5-b16 in L-SIG. The PRL-SIG field 1200 also includes a CRC Repeat subfield 1204. In the CRC Repeat subfield 1204, the CRC bits from CRC subfield 1202 repeat twice and the repeated CRC bits are located in bit positions b18-b23. The CRC protects the Rate subfield (i.e., b0-b3) and Length subfield (i.e., b5-b16) in L-SIG. In other examples, rather than repeating twice, the CRC bits in CRC Repeat subfield 1204 repeat once or repeat more than twice.

Figure 13:
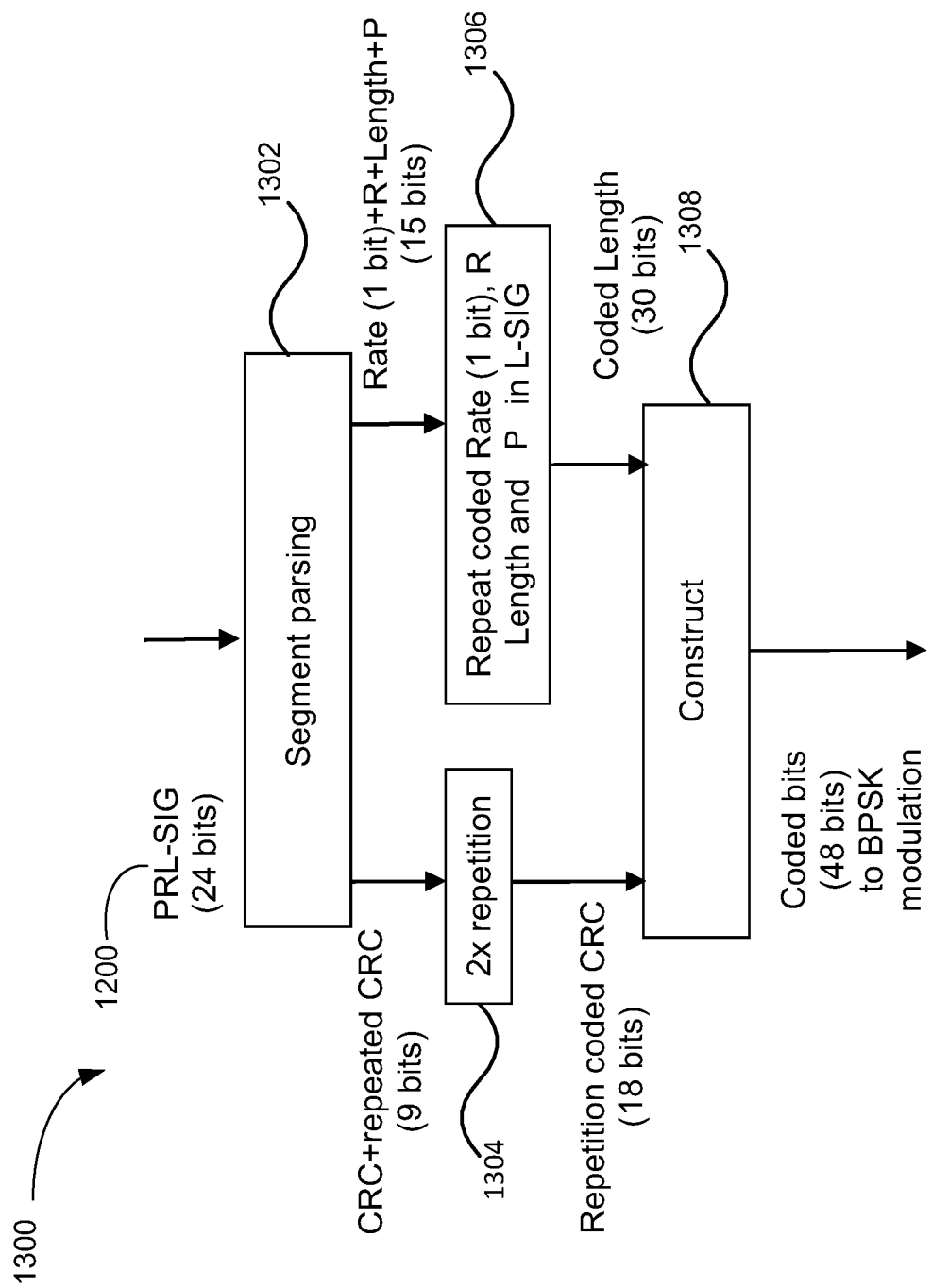
FIG. 13 illustrates an example method of encoding the PRL-SIG field of FIG. 12.

FIG. 13 illustrates an example method 1300 of encoding the PRL-SIG field 1200 of FIG. 12. In an example embodiment, the method 1300 can be performed by the transmitter 310 (FIG. 3A). At step 1302, the transmitter 310 performs segment parsing of the PRL-SIG field 1200 to a first group of bits and a second group of bits. The first group is the CRC subfield 1202 and CRC Repeat subfield 1204, and the second group of bits is the Rate subfield (1 bit at b3), Reserved subfield, Length subfield, and Parity subfield. At step 1304, the transmitter 310 encodes the first group of bits containing the CRC using 2× repetition coding. At step 1306, the transmitter 310 duplicates the coded Rate (1 bit), Reserved, Length, and Parity generated in L-SIG bits. At step 1308, the transmitter 310 constructs together the coded bits from the first group of bits and the second group of bits and sends the constructed 48 coded bits to the symbol modulator 312 (FIG. 3A) for BPSK modulation.

Figure 14:
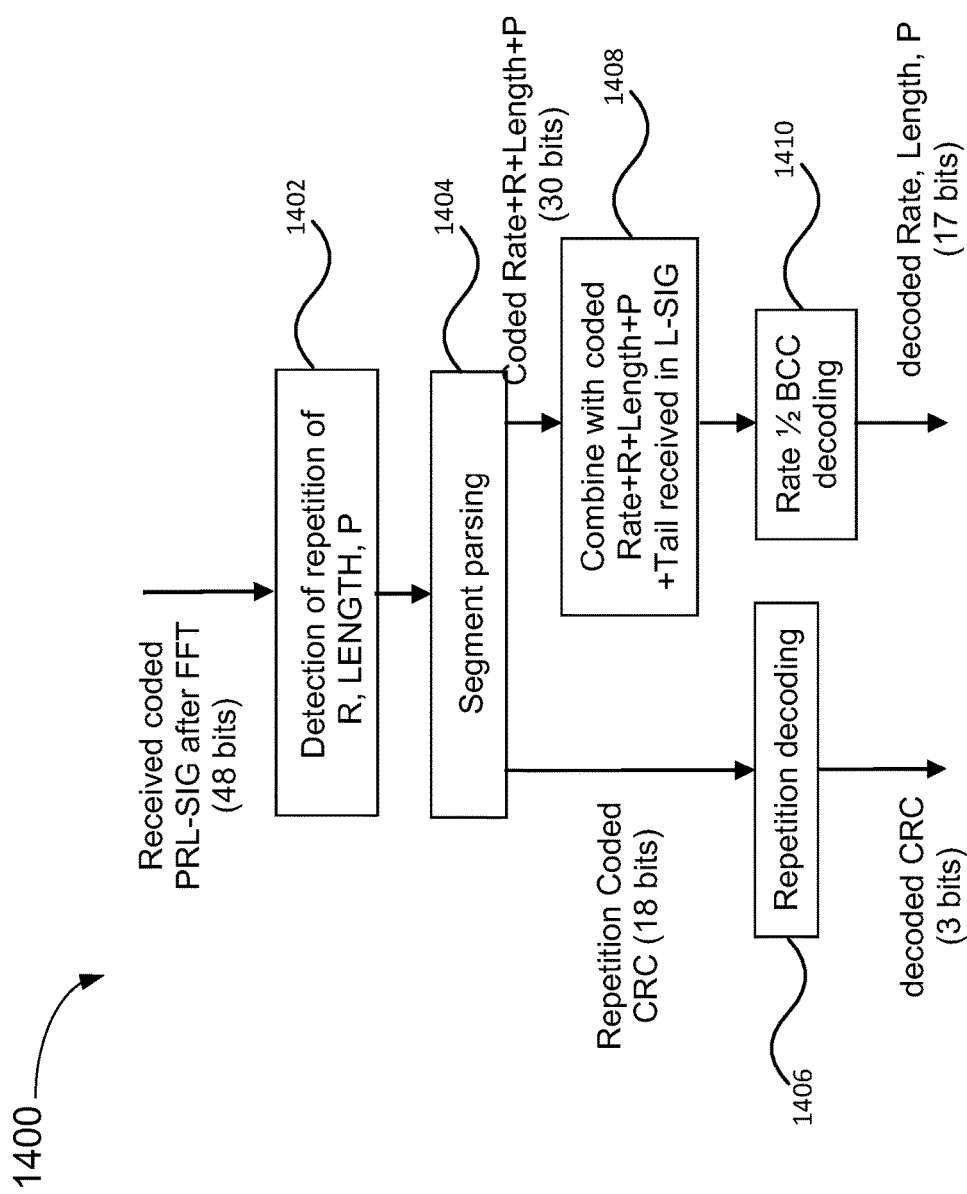
FIG. 14 illustrates an example method of detecting the PRL-SIG field from the signal generated by the method of FIG. 13.

FIG. 14 illustrates an example method 1400 of receiving and detecting the coded PRL-SIG field 1200 from the signal generated by the method 1300 of FIG. 13. The receiver 320 can perform detection of the CRC in the PRL-SIG field 1200, and perform detection of the Length and Parity in both L-SIG and PRL-SIG.

At the receiver 320, a signal (PPDU) in time domain is received and the FFT block 324 of the receiver 320 performs Fast Fourier Transform to recover coded bits of the PRL-SIG field 1200. At step 1402, the receiver 320 detects repetition of the Reserved, Length, and Parity in the coded bits of the PRL-SIG field 1200. At step 1404, the receiver 320 performs segment parsing of the received coded PRL-SIG field 1200 to a first group of bits and a second group of bits. The first group of bits is the repetition coded CRC (which were originally coded from the CRC subfield 1202 and CRC Repeat subfield 1204 of the PRL-SIG 1200). The second group of bits is the coded Rate (1 bit) subfield, Reserved subfield, Length subfield, Parity subfield, which were originally coded from the PRL-SIG 1200. At step 1406, the receiver 320 performs repetition decoding on the first group of bits to generate the decoded bits of the CRC. At step 1408, the receiver 320 combines the second group of bits with coded L-SIG subfields Rate, Reserved, Length, Parity, and Tail, the combination of which at step 1410 is decoded using code rate 1/2 BCC decoding to generate the decoded bits of Rate, Length and Parity.

After detection and decoding of CRC, Rate, Length, and Parity subfields as shown in FIGS. 9, 11 and 14, the receiver 320 can conduct a CRC check (or combination of CRC check and Parity check) onto the protected Rate and Length subfields (from PRL-SIG and L-SIG). If the CRC check (or combination of CRC check and Parity check) passes, the receiver determines the PPDU to be a specified wireless network version, such as IEEE 802.11be. Otherwise, the receiver 320 can further detect whether the PPDU is an IEEE 802.11ax PPDU, or other PPDU types.

Figure 15:
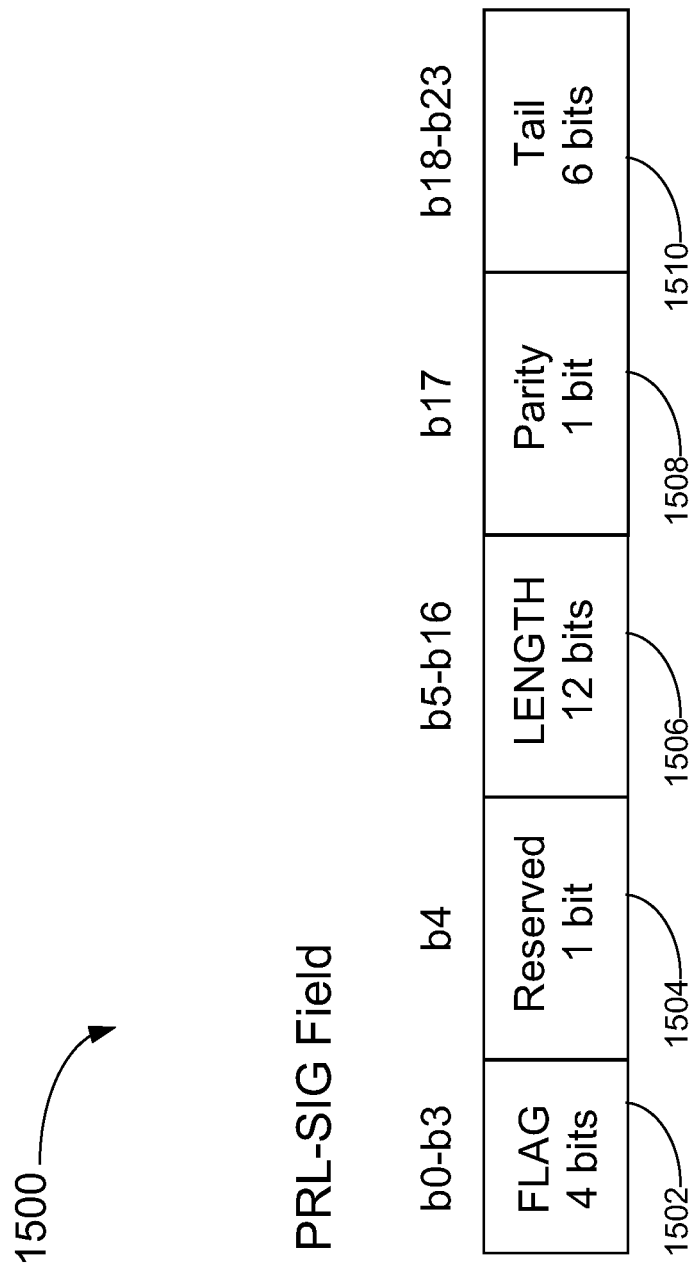
FIG. 15 illustrates an example embodiment of the PRL-SIG field shown in FIG. 6, having a Flag subfield.

FIG. 15 illustrates another example embodiment of the PRL-SIG field 1500, introduced in FIG. 6 as PRL-SIG field 608, in which the PRL-SIG field 1500 has a Flag subfield 1502. The PRL-SIG field 1500 is an identifier field for automatic detection of the wireless network version. The PRL-SIG field 1500 includes a Reserved subfield 1504, a Length subfield 1506, a Parity subfield 1508, and a Tail subfield 1510. As defined in IEEE 802.11ax and proposed IEEE 802.11be, the Rate in the L-SIG is set to "1101" to indicate a fixed rate of 6 Mbps. An example embodiment of the PPDU 600 includes the partial RL-SIG (PRL-SIG) field 1500 which is subsequent to the L-SIG. Because the Rate subfield of the L-SIG is set to a known value in the L-SIG, the Rate does not need to be verified by the receiver 320. Therefore, in the PRL-SIG field 1500, the Rate subfield defined in L-SIG can be (at least partially) different than the PRL-SIG field 1500, with a Flag subfield 1502 at the same corresponding subfield location (corresponding bit positions). The remaining bits in the remaining subfields defined in L-SIG can be repeated in the PRL-SIG field 1500 in an example. The Flag 1502 is set to a predefined value which is different from "1101" to indicate the specified wireless network version of the PPDU, such as IEEE 802.11be or future amendments. Various different flags can each represent a different wireless network version in some examples.

The PRL-SIG field 1500 of FIG. 15 includes a Flag subfield 1502 of 4 bits and Tail subfield 1510 of 6 bits. For encoding of the PRL-SIG field 1500 of FIG. 15, the Flag subfield 1502 and the Tail subfield 1510 are coded together by the coding block 334 using a code rate 1/2 BCC encoder (e.g., the same type of BCC encoder as used for L-SIG). The generation of the coded PRL-SIG 1500 from FIG. 15 is similar to the method 800 of generating the coded PRL-SIG as illustrated in FIG. 8, by replacing "CRC" with "Flag".

At the receiver 320, detection and interpreting Flag subfield 1502 in the PRL-SIG field 1500 and the Length and Parity in both L-SIG field and PRL-SIG field 1500 are similar to the method 900 of detecting and interpreting of the coded PRL-SIG as shown in FIG. 9, by replacing "CRC" with "Flag".

Another example format of the PRL-SIG will now be described, not shown. The format of the PRL-SIG in this example is the same as the PRL-SIG 1500 as shown in FIG. 15. In the example PRL-SIG, the encoding for the Flag is different than the PRL-SIG field 1500. The bits of the Flag subfield 1502 are coded with a code rate 1/2 tail biting BCC encoder. A tail biting convolutional code does not require tail bits for termination. Generation of the coded PRL-SIG is similar to the method 1000 for generation of the coded PRL-SIG 700 as illustrated in FIG. 10, by replacing "CRC" with "Flag". At the receiver 320, detection and interpreting of Flag in the example PRL-SIG and the Length and Parity in both L-SIG and PRL-SIG are similar to the method 1100 of receiving and interpreting the PRL-SIG 700 as illustrated in FIG. 11, by replacing "CRC" with "Flag".

Figure 16:
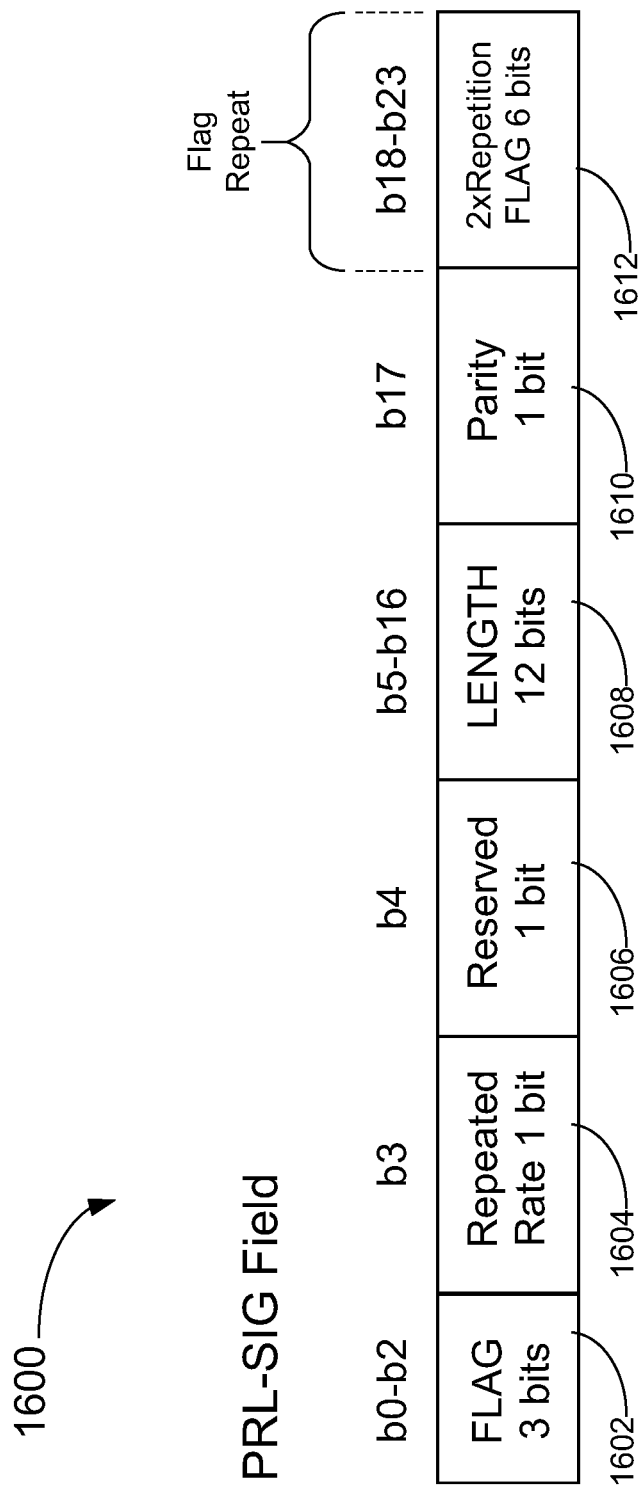
FIG. 16 illustrates another example embodiment of the PRL-SIG field shown in FIG. 6 having a Flag subfield.

FIG. 16 illustrates another example embodiment of the PRL-SIG field 1600, introduced in FIG. 6 as PRL-SIG field 608. The PRL-SIG field 1600 is an identifier field for automatic detection of the wireless network version. The PRL-SIG field 1600 includes a Flag subfield 1602, Repeated Rate subfield 1604, Reserved subfield 1606, Length subfield 1608, Parity subfield 1610, and Flag Repeat subfield 1612. The subfields in the PRL-SIG field 1600 include a 3-bit Flag subfield 1602, which is repeated twice and the repeated bits are located into the Flag Repeat subfield 1612 (bit positions b18-b23) of the PRL-SIG field 1600. In other examples, the Flag subfield 1602 is repeated once, or more than twice, in the Flag Repeat subfield 1612.

The method of generation of coded PRL-SIG 1600 from FIG. 16 is similar to the method 1300 of generating the coded PRL-SIG 1200 as illustrated in FIG. 13, by replacing "CRC" with "Flag".

At the receiver 320, detection and interpreting of Flag subfield 1602 in PRL-SIG field 1600 and the Length and Parity in both L-SIG and PRL-SIG field 1600 are similar to the method 1400 of receiving and interpreting as shown in FIG. 14, by replacing "CRC" with "Flag".

After detection and decoding of Flag, Rate, Length, and Parity subfields as stated above, similar to a HE receiver, the receiver 320 can check whether Rate, Length and Parity are valid by comparing to L-SIG as defined in IEEE 802.11ax. If Rate, Length and Parity are valid, the receiver 320 further checks Flag. If Flag is valid, the receiver 320 determines the PPDU is a specified wireless network version such as IEEE 802.11be PPDU. Otherwise the PPDU is the HE PPDU. If Rate, Length or Parity is not valid, the receiver 320 can detect other legacy PPDU types.

Figure 17A:
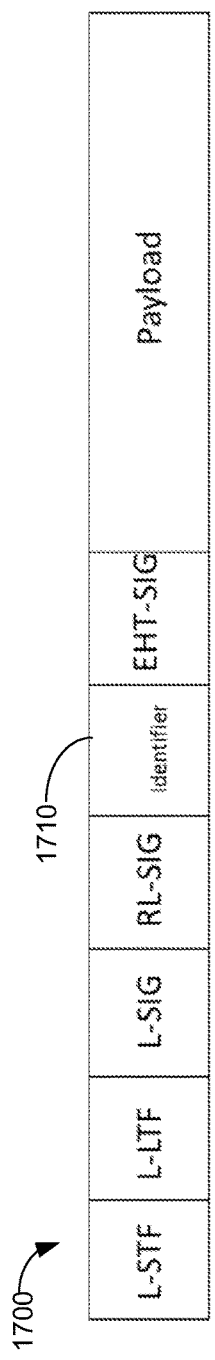
FIG. 17A illustrates a first example embodiment of an OFDM PPDU for indicating both the Physical Layer (PHY) version and the frame-type of the OFDM PPDU.
Figure 17B:
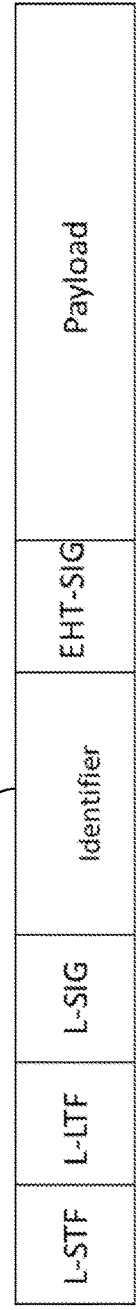
FIG. 17B illustrates a second example embodiment of an OFDM PPDU for indicating both PHY version and frame-type.
Figure 17C:
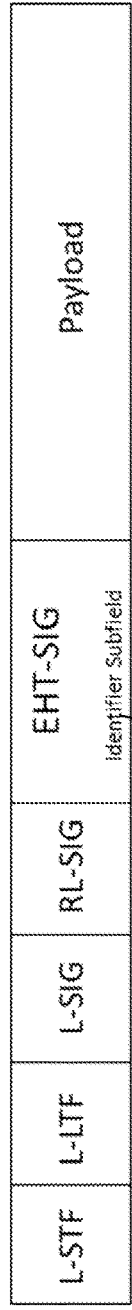
FIG. 17C illustrates a third example embodiment of an OFDM PPDU for indicating both PHY version and frame-type.
Figure 17D:
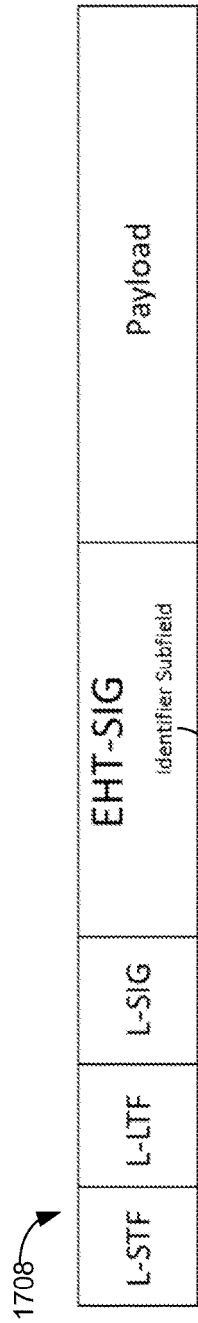
FIG. 17D illustrates a fourth example embodiment of an OFDM PPDU for indicating both PHY version and frame-type.
Figure 17E:
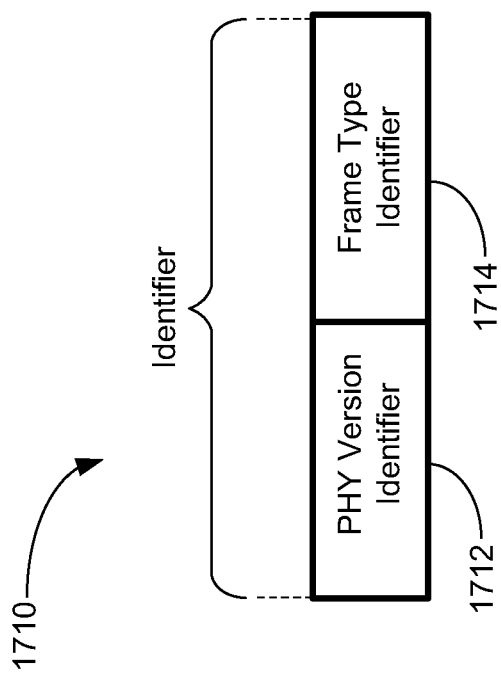
FIG. 17E illustrates an example indicator for indicating both PHY version and frame-type, in accordance with an example embodiment.

Reference is now made to FIGS. 17A, 17B, 17C, 17D, 17E. In FIG. 17E, in an example embodiment, the auto-detection of the wireless network version of the PPDU can be provided by an Identifier 1710. FIGS. 17A, 17B, 17C, 17D illustrate various example embodiments of an OFDM PPDU having the Identifier 1710, for indicating both the Physical Layer (PHY) version and the frame-type of the OFDM PPDU.

The Identifier 1710 can be a field or a subfield of the PPDU, and is contained within the PHY header (preamble). The Identifier 1710 has a PHY Version Identifier 1712. The PHY Version Identifier 1712 can be used to indicate the wireless network version, e.g. IEEE 802.11 version or an amendment version. This allows for extensibility of the auto-detection method for IEEE 802.11be and future versions or standards. The Identifier 1710 also indicates the frame format type, referred to herein as a Frame Type Identifier 1714. The Frame Type Identifier 1714 can identify frame types such as MU, SU, TB or ER SU PPDU. The Frame Type Identifier 1714 can be used to identify any other possible frame type and future frame types.

In various examples, the Identifier 1710 is greater than 4 bits, greater than 10 bits, equal to 8 bits, or equal to 10 bits. In an example, 3 to 4 bits are used for the PHY Version Identifier 1712, and 6 to 7 bits are used for the Frame Type Identifier 1714 (totaling 10 bits in each case). FIGS. 17A, 17B, 17C, 17D show example locations of the Identifier 1710 in a PPDU.

The number of symbols for the Identifier 1710 can be one symbol in an example, or more than one symbol in other examples. In an example embodiment, the Identifier 1710 can be subsequent to the RL-SIG or L-SIG. In another example, the Identifier 1710 can be within the SIG field particular to signaling information of the indicated wireless network version, such as an EHT-SIG field as a subfield type.

FIG. 17A illustrates a first example embodiment of the OFDM PPDU 1700, wherein the Identifier 1710 is a field that is separate from, and subsequent to, the L-SIG and RL-SIG. In some examples, the Identifier 1710 is transmitted after the L-SIG and the RL-SIG.

FIG. 17B illustrates a second example embodiment of the OFDM PPDU 1702, wherein the Identifier 1710 is a field that is subsequent to L-SIG, and there is no RL-SIG in this example OFDM PPDU 1702. In some examples, the Identifier 1710 is transmitted after the L-SIG.

FIG. 17C illustrates a third example embodiment of the OFDM PPDU 1704, wherein the Identifier 1710 is a subfield within a SIG field particular to signaling information of the indicated wireless network version, such as EHT-SIG 1716 in this example. In the OFDM PPDU 1704, the Identifier 1710 is a subfield within EHT-SIG 1716, and EHT-SIG 1716 is separate from, and subsequent to, L-SIG and RL-SIG. In some examples, the Identifier 1710 subfield is transmitted after the L-SIG and the RL-SIG.

In the OFDM PPDU 1706 of FIG. 17D, the Identifier 1710 is a subfield within the EHT-SIG 1716, and EHT-SIG 1710 is subsequent to L-SIG. There is no RL-SIG in the example PPDU 1706 of FIG. 17D. In some examples, the Identifier 1710 subfield is transmitted after the L-SIG.

As shown in FIG. 17E, in an example embodiment, the Identifier 1710 includes the PHY Version 1712 as a separate subfield (separate bits) from the Frame Type Identifier 1714. The Identifier 1710 includes a first set of one or more bits that represent the PHY Version Identifier 1712 of the transmission and a second set of one or more bits that represent the Frame Type Identifier 1714 of the transmission. In another example, not shown here, the Identifier 1710 includes at least some shared bits that represent both the wireless network version of the transmission and the Frame Type Identifier 1714 of the transmission. In other words, a predefined coding scheme, lookup table, specified policy, algorithm, etc., can be used to translate the bits of the Identifier 1710 to each of the PHY Version Identifier 1712 and the Frame Type Identifier 1714.

In an example, not shown here, the Identifier 1710 can be within a trigger frame to solicit uplink transmission. In an example, not shown here, the Identifier 1710 can be within a preamble of the uplink transmission, having a field or subfield position similar to any one of the OFDM PPDU 1700, 1702, 1704, 1706.

Figure 18A:
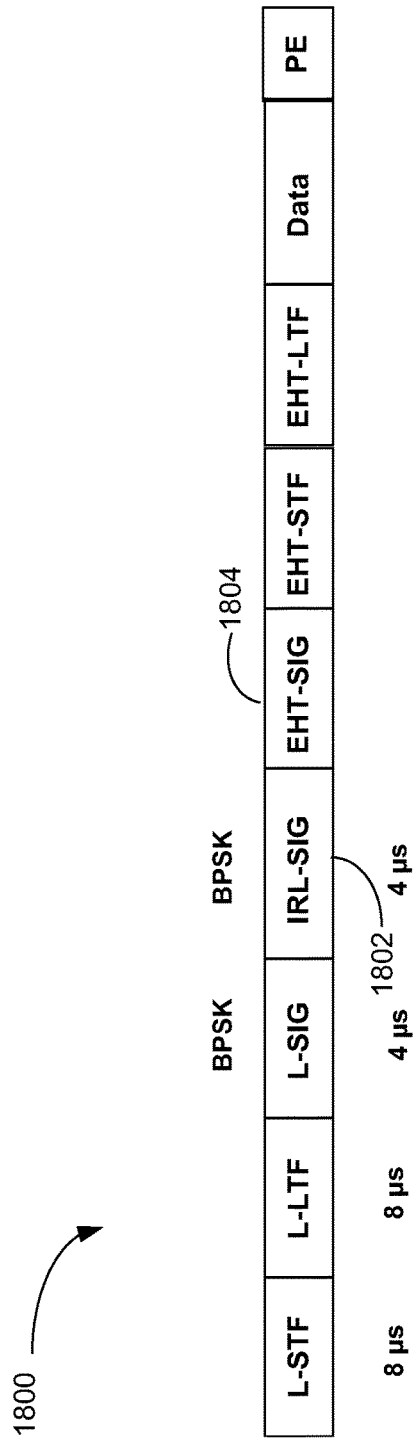
FIG. 18A illustrates an example embodiment of an OFDM PPDU having auto-detectable wireless network version indication using an Interleaved RL-SIG (IRL-SIG) field.

FIG. 18A illustrates an example embodiment of an OFDM PPDU 1800 having auto-detectable wireless network version indication using a different version of the RL-SIG, by way of an Interleaved RL-SIG (IRL-SIG) field 1802. The IRL-SIG field 1802 is an identifier field for automatic detection the wireless network version. The OFDM PPDU 1800 includes the same L-STF, L-LTF and L-SIG fields that are defined by legacy standards. The OFDM PPDU 1800 can include one or more SIG fields particular to signaling information of the indicated wireless network version, such as EHT Signaling Fields 1804 in this example. In the example OFDM PPDU 1800, a different version of the L-SIG in the coded bit level is the IRL-SIG field 1802, in which an interleaved version of the coded bits from the L-SIG is generated by re-arranging the order of bits from the L-SIG using a specified interleaver known by both the transmitter 310 and the receiver 320. The IRL-SIG field 1802 is subsequent to the L-SIG field in the OFDM PPDU 1800. In an example embodiment, the specified interleaver can be predetermined. In an example embodiment, the specified interleaver is particular to the wireless network version (e.g. EHT 802.11be, or other version).

In the OFDM PPDU 1800 of FIG. 18A, automatic detection of the specified wireless network version of the PPDU, e.g. IEEE 802.11be PPDU, is conducted based on a check by comparing L-SIG with the recovery of L-SIG from the IRL-SIG field 1802. The IRL-SIG field 1802 is represented in the data sub-carrier level. In IRL-SIG field 1802, the data sub-carriers are obtained by interleaving the data sub-carriers of L-SIG.

Figure 19:
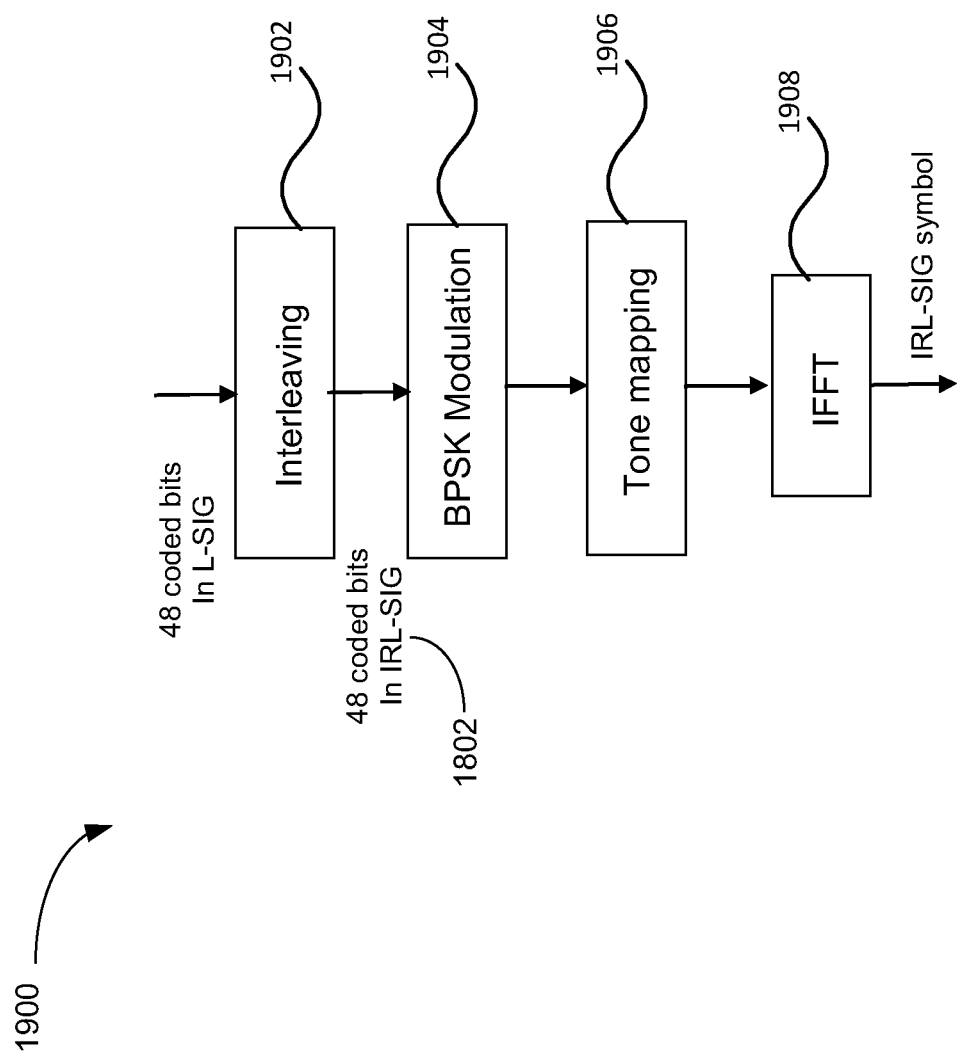
FIG. 19 illustrates an example method of encoding the IRL-SIG field of the PPDU of FIG. 18A.

FIG. 19 illustrates an example method 1900 of generating the IRL-SIG field 1802 of the OFDM PPDU 1800 of FIG. 18A. At step 1902, the transmitter 310 interleaves coded bits in L-SIG field with the specified interleaver to generate the IRL-SIG field 1802. At step 1904 the coded bits of IRL-SIG field 1802 are BPSK modulated using the symbol modulator 312. At step 1906, the tone mapping block 314 of the transmitter 310 performs tone mapping of the BPSK modulated IRL-SIG. At step 1908, the IFFT block 315 of the transmitter 310 then applies OFDM modulation over the sub-carrier signals in accordance with the tone mapping, by performing an IFFT, arriving at an IRL-SIG symbol.

In an alternate example, step 1902 is performed after step 1904. For example, the transmitter 301 first performs BPSK modulation on the IRL-SIG (which is the same as L-SIG at this point). Then, the transmitter 301 interleaves the BPSK modulated signals with a specified interleaver, prior to or as part of the tone mapping by the tone mapping block 314.

Figure 20:
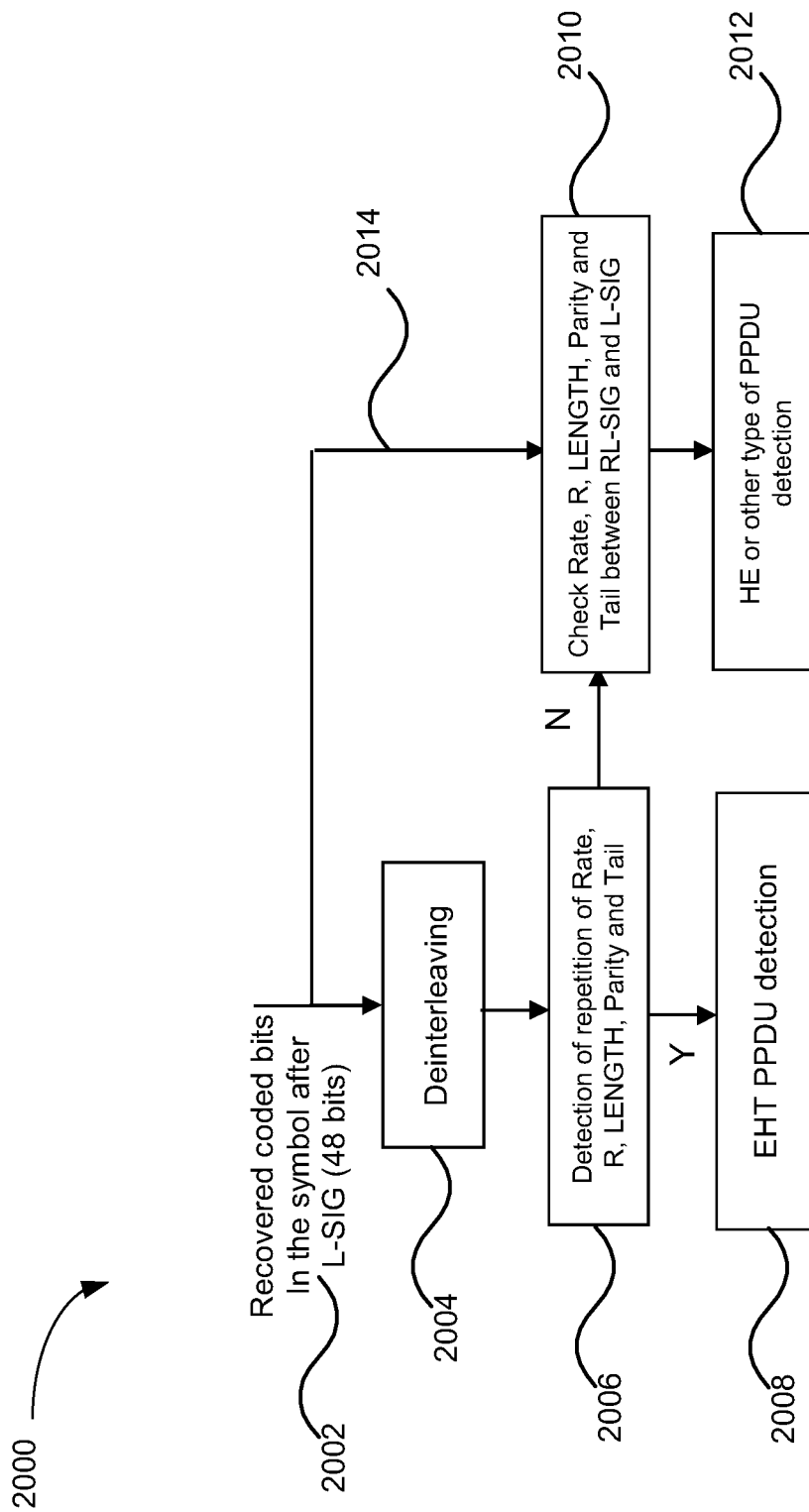
FIG. 20 illustrates an example method of detecting the IRL-SIG field from the signal generated by the method of FIG. 19.

FIG. 20 illustrates an example method 2000 of receiving and detecting the IRL-SIG field 1802 from the signal generated by the method 1900 of FIG. 19. At step 2002, at the receiver 320, a signal (PPDU) in time domain is received and the FFT block 324 of the receiver 320 performs Fourier Transform to recover coded bits, and observes the first symbol after the L-SIG in the OFDM PPDU 1800 (FIG. 18). To determine whether the first symbol after the L-SIG is the IRL-SIG field 1802, at step 2004, the receiver 320 performs deinterleaving of the recovered bits of the first symbol after the L-SIG. At step 2006, the receiver 320 checks the recovered bits and compares the deinterleaved Rate, Reserved, Length, Parity and Tail recovered at step 2004 with the L-SIG. If there is repetition detected in step 2006 between the recovered bits from step 2004 and the L-SIG, at step 2008 the receiver 320 detects and concludes that the PPDU is a specified wireless network version, e.g., IEEE 802.11be in this example. If the check at step 2006 is not satisfied because the first symbol is found to be merely RL-SIG (non-interleaved), at step 2010 a check is performed between the Rate, Reserved, Length, Parity and Tail of RL-SIG (which is the first symbol after L-SIG) and L-SIG. At step 2012 if the check at step 2010 is satisfied the receiver detects the received PPDU as being an HE PPDU (802.11ax), or other checks are performed to determine whether the received PPDU is another wireless network type (which would be neither 802.11be nor 802.11ax).

The alternate path 2014 in FIG. 20 illustrates some instances where the HE PPDU (802.11ax) is checked separately from, or in parallel with, the deinterleaving step 2004. At step 2002, the first symbol after L-SIG may be RL-SIG. At step 2010, the receiver 320 checks the recovered bits by comparing the Rate, Reserved, Length, Parity and Tail of the RL-SIG with the L-SIG. At step 2012, if the check is satisfied, the receiver detects the PPDU as being an HE PPDU (802.11ax).

Alternatively, the receiver 320 checks the deinterleaved subcarriers of the first received symbol after L-SIG by comparing with the subcarriers of L-SIG. If there is repetition between the deinterleaved subcarriers of the first symbol after the L-SIG and the subcarriers of the L-SIG, the receiver detects and concludes that the PPDU is a specified wireless network version, e.g., IEEE 802.11be in this example. If the check is not satisfied, a second repetition check is performed between the subcarriers of the first symbol after the L-SIG and the subcarriers of the L-SIG. If the second repetition check between the subcarriers of the first symbol after the L-SIG and the subcarriers of the L-SIG is satisfied, the receiver detects and concludes that the received PPDU is an HE PPDU (802.11ax). If the second repetition check is not satisfied between the subcarriers of the first symbol after the L-SIG and the subcarriers of the L-SIG, other checks are performed to determine whether the received PPDU is another wireless network type (which would be neither 802.11be nor 802.11ax).

In an example embodiment, multiple different specified interleavers can each respectively indicate a different wireless network version (PHY type) to generate the IRL-SIG. The IRL-SIG is an indication of one of a plurality of possible PHY types. In an example, the receiver 320 can be configured to perform blind selection of different possible interleavers of the received transmission until the L-SIG is matched with the recovered L-SIG from the detected IRL-SIG field 1802. In examples, the blind selection can be performed in a specified order or in random order.

Figure 18B:
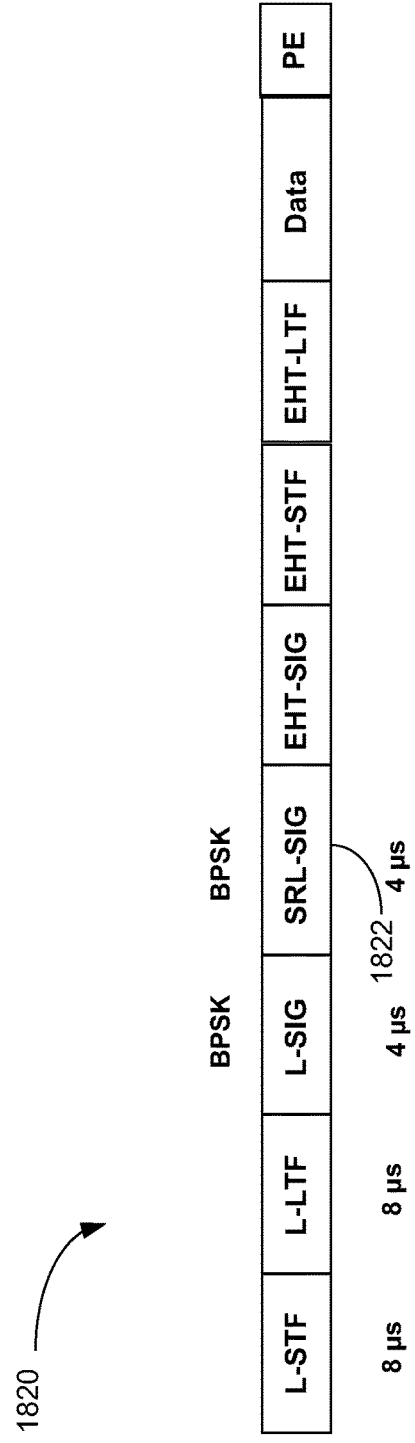
FIG. 18B illustrates an example embodiment of an OFDM PPDU having auto-detectable wireless network version indication using a Scrambled RL-SIG (SRL-SIG) field.

FIG. 18B illustrates an example embodiment of an OFDM PPDU 1820 having auto-detectable wireless network version indication using a different version of the RL-SIG by way of a Scrambled RL-SIG (SRL-SIG) field 1822. The SRL-SIG field 1822 is an identifier field for automatic detection of the wireless network version. In the OFDM PPDU 1820, rather than interleaving as in FIG. 18A, the RL-SIG of a PPDU is modified by scrambling the L-SIG to generate a scrambled RL-SIG (SRL-SIG) field 1822. A scrambling sequence or scrambling function is used to generate the SRL-SIG field 1822. Referring to the OFDM PPDU 1800 of FIG. 18A, for example, the SRL-SIG field 1822 in this OFDM PPDU 1820 instead of the IRL-SIG field 1802 of the OFDM PPDU 1800.

The OFDM PPDU 1820 can include one or more SIG fields particular to signaling information of the indicated wireless network version, such as EHT Signaling Fields in this example. In an example embodiment, the specified scrambling sequence can be predetermined. In an example embodiment, the specified scrambling sequence is particular to the wireless network version (e.g. EHT, or other version).

The generating and encoding of the OFDM PPDU 1820 of FIG. 18B by the transmitter 310 can follow a similar method 1900 as in FIG. 19, with a scrambling step using the specified scrambling sequence (or scrambling function) performed instead of the interleaving step 1902. The receiving and interpreting of the OFDM PPDU 1820 for auto-detection of the wireless network version by the receiver 320 can follow a similar method 2000 as in FIG. 20, with a descrambling step using the specified scrambling sequence (or descrambling function) performed instead of the deinterleaving step 2004.

Figure 21:
FIG. 21 illustrates an example of an OFDM PPDU having auto-detectable wireless network version indication using a Cyclic Shifted RL-SIG (CS-RL-SIG) field, in accordance with an example embodiment.

FIG. 21 illustrates an example of an OFDM PPDU 2100 having auto-detectable wireless network version indication using a modified RL-SIG, denoted as Cyclic Shifted RL-SIG (CS-RL-SIG) field 2102, in accordance with an example embodiment. The CS-RL-SIG field 2102 is an identifier for automatic detection the wireless network version. As shown in FIG. 21, the OFDM PPDU 2100 keeps the L-STF, L-LTF and L-SIG symbols unchanged. The RL-SIG symbol is the symbol after the L-SIG symbol. A modification of the RL-SIG signal in the time domain is performed, in which the RL-SIG signal in the time domain after the IFFT block 315 is cyclic shifted before adding cyclic prefix (CP) by the CP generator 316. The cyclic shifting distance is known by both the transmitter 310 and the receiver 320. At the coded bit level, the CS-RL-SIG 2102 is a repeat of the L-SIG 2104.

The receiver 320 can perform autodetection of the PPDU 2100 as being a specified wireless network version, e.g., IEEE 802.11be, based a check of the repetition of a shifted version of CS-RL-SIG 2102 compared with L-SIG 2104. In the OFDM PPDU 2100, the CS-RL-SIG 2102 is a cyclic shifted repeat L-SIG signal 2104 in the time domain. The CS-RL-SIG signal is obtained by cyclic shifting, in the time domain, a RL-SIG signal before adding cyclic prefix by cyclic prefix generator 316.

Figure 22:
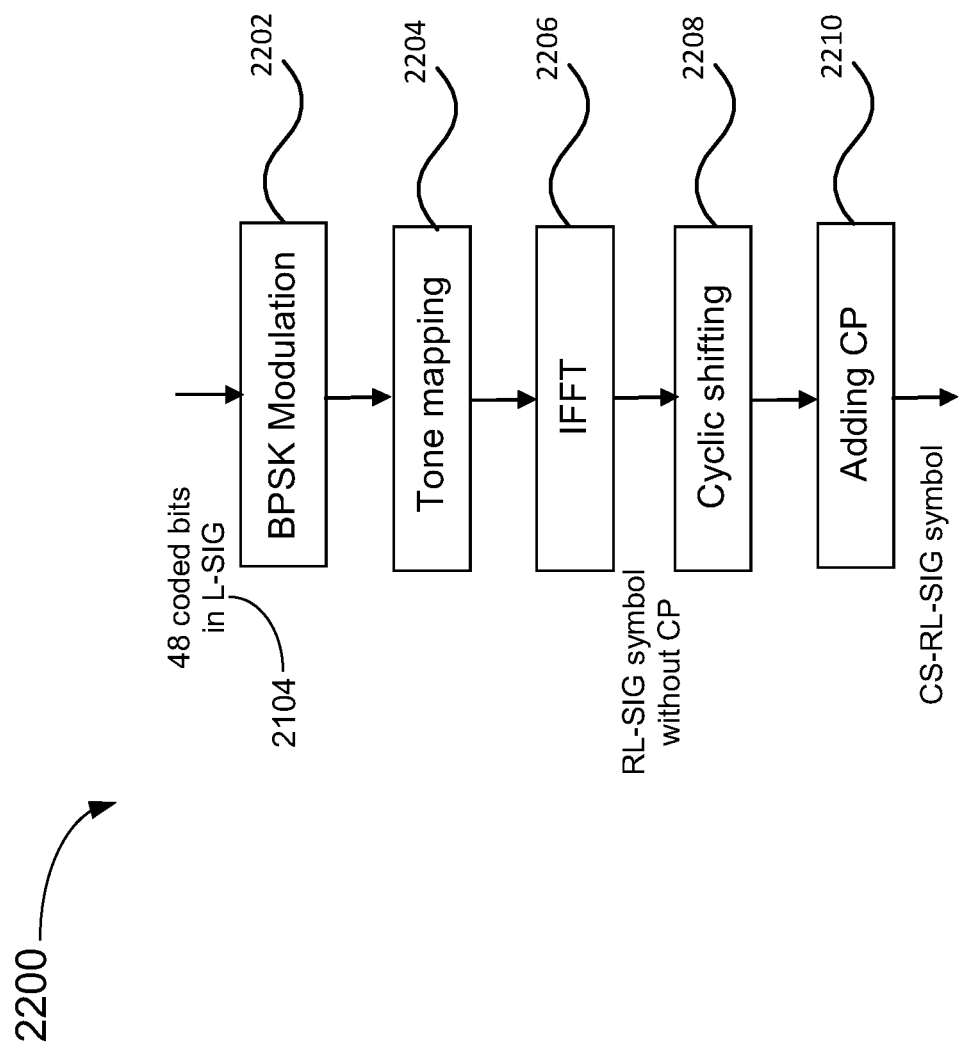
FIG. 22 illustrates an example method of encoding the CS-RL-SIG field of FIG. 21.

FIG. 22 illustrates an example method 2200 of generating and coding the CS-RL-SIG field 2102 shown in FIG. 21. The method 2200 can be performed by the transmitter 310. At step 2202, the coded bits of L-SIG 2104 are BPSK modulated using the symbol modulator 312. At step 2204, the tone mapping block 314 of the transmitter 310 tone maps the BPSK modulated L-SIG. At step 2206, the IFFT block 315 performs IFFT in accordance with the tone mapping, arriving at a RL-SIG symbol in time domain without cyclic prefix. At step 2208, the Cyclic Shifter 330 performs cyclic shifting at a specified cyclic shifting distance known by both the transmitter 310 and the receiver 320, to generate a CS-RL-SIG symbol. At step 2210, the cyclic prefix generator 316 adds a cyclic prefix to the CS-RL-SIG symbol.

Detecting and decoding the coded CS-RL-SIG field is performed by the receiver 320 by, in time domain, removing the cyclic prefix by performing cyclic shifting to reverse the cyclic shifting from the method 2200 of FIG. 22. After FFT by the FFT block 324, the recovered field from the coded CS-RL-SIG field 2102 is compared with the L-SIG 2104, with a match being the indication of the specified wireless network version, e.g., IEEE 802.11be. Otherwise, another wireless network version or legacy version may be detected. In an example, multiple different specified cyclic shifting distances can each respectively indicate a different wireless network version (PHY type) to generate the CS-RL-SIG.

Figure 23:
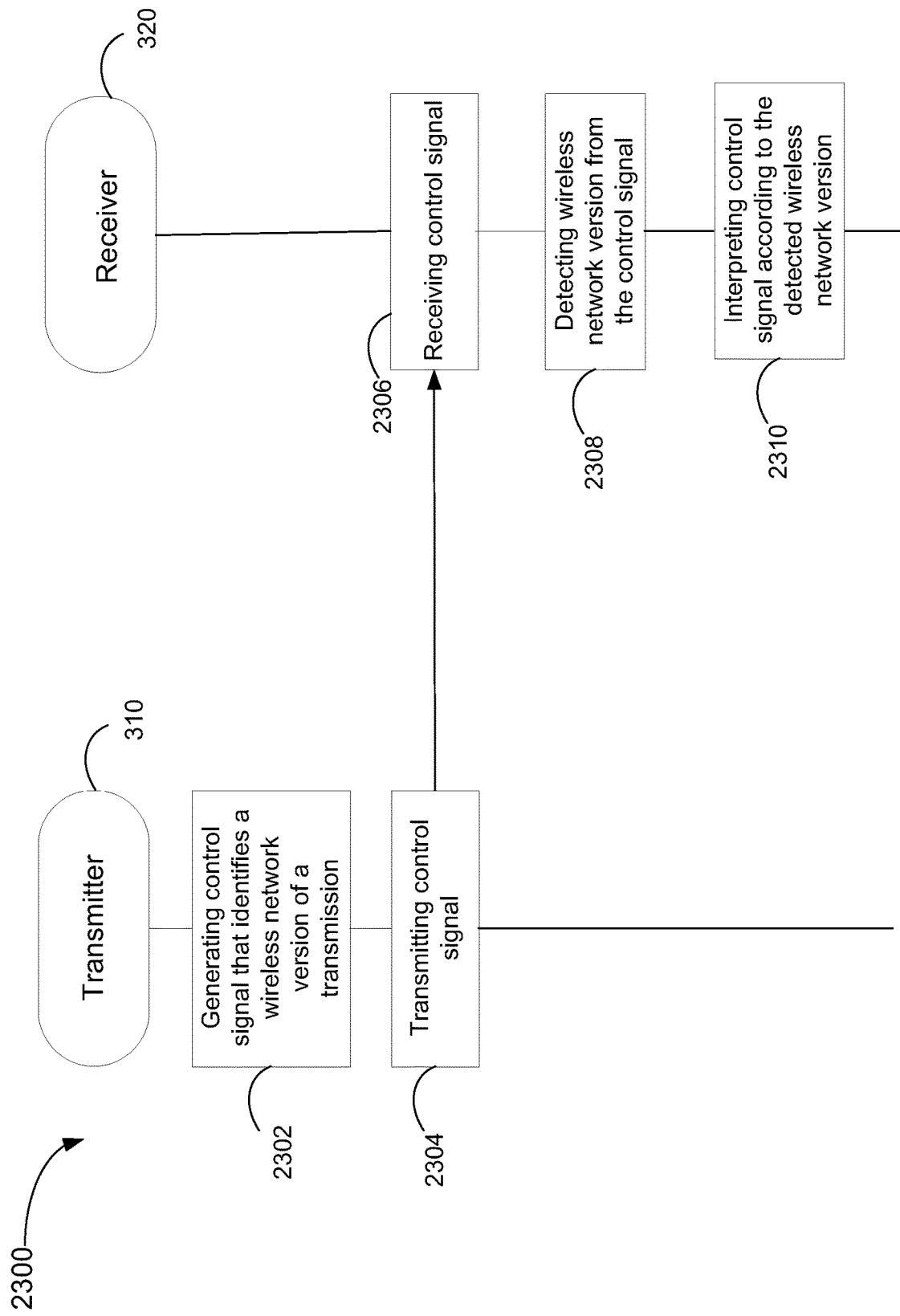
FIG. 23 illustrates an example method for enabling automatic wireless network version detection within transmissions, in accordance with an example embodiment.

FIG. 23 illustrates an example method 2300 for enabling automatic wireless network version detection within transmissions, in accordance with an example embodiment. At step 2302, the transmitter 310 generates a control signal for a transmission. In one example, the control signal includes i) a Legacy Signal (SIG) (L-SIG) symbol and ii) an identifier symbol which is generated from at least part of, but is not identical to, the L-SIG symbol, the identifier symbol indicates a wireless network version of the transmission. In another example, the control signal includes a Legacy Signal (SIG) (L-SIG) field, a Repeated L-SIG (RL-SIG) field, and an identifier separate from the L-SIG field and the RL-SIG field, the identifier indicates i) a wireless network version of the transmission and ii) a frame type of the transmission.

At step 2304, the transmitter 310 transmits the control signal. In some examples, at step 2304 the transmitting of the control signal includes transmitting the identifier symbol after the L-SIG symbol. At step 2306, the receiver 320 receives the control signal. At step 2308, the receiver 320 detects the wireless network version of the transmission from the control signal. At step 2310, the receiver 320 interprets the control signal according to the detected wireless network version.

The described example embodiments of the control signal (preamble) for auto-detection of the wireless network version can be applied to uplink transmission, not shown here. In an example, the control signal can be within a trigger frame to solicit uplink transmission. In an example, the control signal can be within a preamble of the uplink transmission.

Figure 1C:
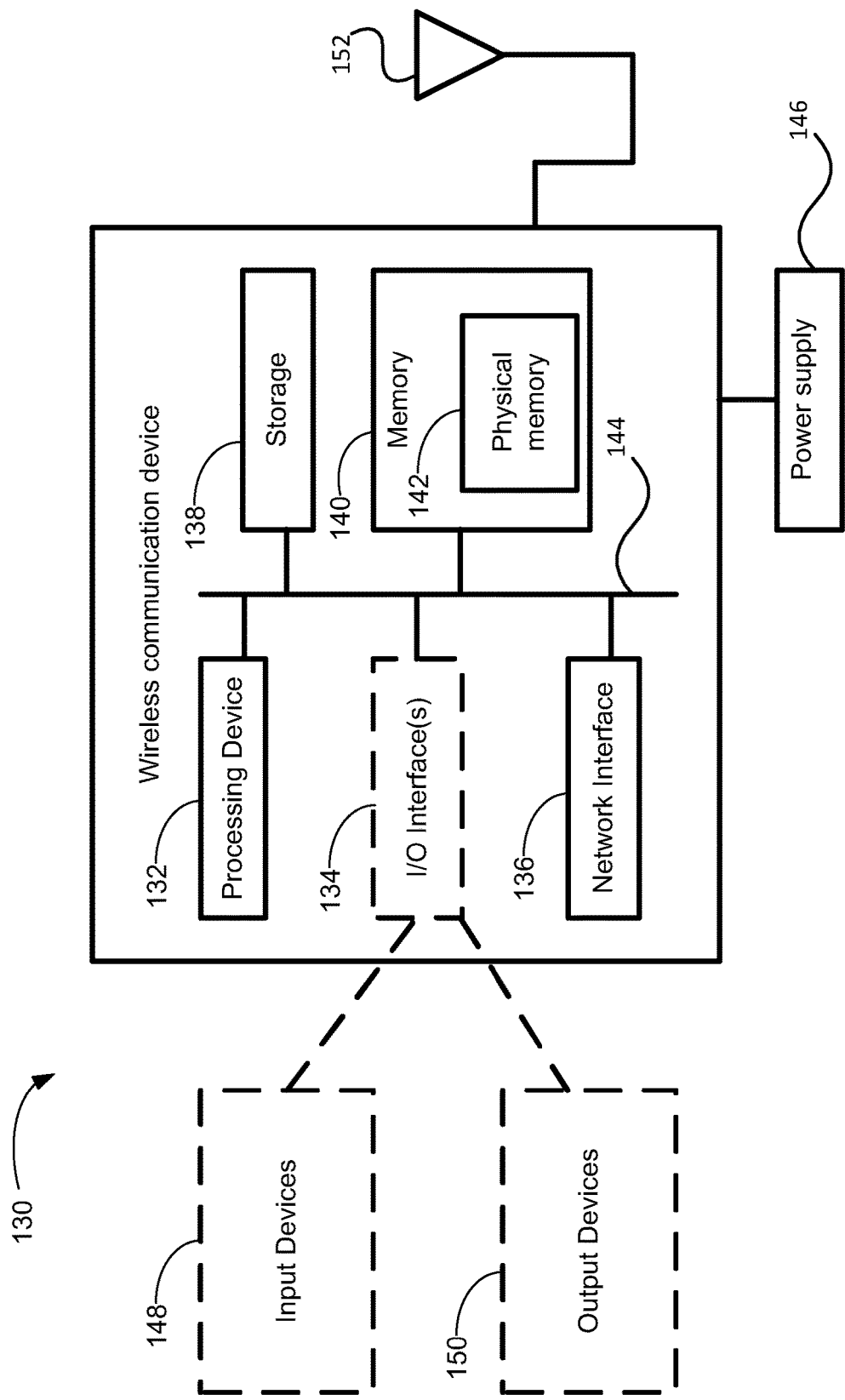
FIG. 1C is a schematic representation of an example wireless communication device according to an example embodiment.

FIG. 1C is a schematic diagram of an example wireless communication device 130, in accordance with example embodiments. For example, the wireless communication device 130 may be the AP 101 or the STA 102, and may include the transmitter 310 (FIG. 3A) or the receiver 320 (FIG. 3B). The wireless communication device 130 may be used for both Single User (SU) and multiple access communications within the wireless communication system 100. Although FIG. 1C shows a single instance of each component, there may be multiple instances of each component in the wireless communication device 130 and the wireless communication device 130 could be implemented using parallel and distributed architecture. Some of the components in FIG. 1C are optional in some examples.

The wireless communication device 130 may include one or more processing devices 132, such as a processor, a microprocessor, an application-specific integrated circuit (ASIC), a field-programmable gate array (FPGA), a dedicated logic circuitry, or combinations thereof. The wireless communication device 130 may also include one or more optional input/output (I/O) interface(s) 134, which may enable interfacing with one or more optional input devices 148 and output devices 150. The wireless communication device 130 may include one or more network interfaces 136 for wired or wireless communication with a network (e.g., an intranet, the Internet, a Peer-to-Peer (P2P) network, a Wide Area Network (WAN), a wireless WAN (WWAN), a Local Area Network (LAN), or a Radio Access Network (RAN)) or other node. Wireless networks may make use of wireless connections transmitted over an antenna 152. The network interface(s) 136 may provide multiple access wireless communication via one or more transmitters or transmit antennas and one or more receivers or receive antennas, for example. In this example, one antenna 152 is shown, which may serve for multiple access transmission. However, in other examples there may be multiple antennas for transmitting and receiving. In some examples, an antenna array may be used. The wireless communication device 130 may also include one or more storage units 138, which may include a mass storage unit such as a solid state drive, a hard disk drive, a magnetic disk drive or an optical disk drive.

The wireless communication device 130 may include one or more non-transitory memories 140 that can include physical memory 142, which may include a volatile or non-volatile memory (e.g., a flash memory, a random access memory (RAM), or a read-only memory (ROM)). The memory 140 (as well as storage unit(s) 138) may store instructions for execution by the processing device(s) 132, such as to carry out processing such as those described in the present disclosure. The memory 140 may include other software instructions, such as for implementing an operating system (OS), and other applications/functions. In some examples, one or more data sets or modules may be provided by an external memory (e.g., an external drive in wired or wireless communication with the wireless communication device 130) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

In some examples, there may be a bus 144 providing communication among components of the wireless communication device 130. The bus 144 may be any suitable bus architecture including, for example, a memory bus, a peripheral bus or a video bus. Optional input device(s) 148 (e.g., a keyboard, a mouse, a microphone, a touchscreen, or a keypad) and optional output device(s) 150 (e.g., a display, a speaker or a printer) are shown as external to the wireless communication device 130, and connected to optional I/O interface(s) 134. In other examples, one or more of the input device(s) 148 or the output device(s) 150 may be included as a component of the wireless communication device 130.

The transmitter 310 and the receiver 320 may be included as one or more components of the wireless communication device 130. For example, the transmitter 310 and the receiver 320 may be included as a single component for transmitting and receiving radio frequency (RF) analog signals. In other examples, the transmitter 310 and the receiver 320 may be included as two separate components for transmitting and receiving radio frequency (RF) analog signals respectively. The transmitter 310 may provide transmission of PPDUs and the receiver 320 may receive the PPDU.

When the wireless communication device 130 is the AP 101, communication with selected or associated STAs 102 can be performed using the antenna 152. The processing device 132 may carry out the steps and functions described herein. When the wireless communication device 130 is a STA 102, communications with the AP 101 can be performed via the antenna 152.

The wireless communication device 130 also includes a power supply block 146 to supply power to the wireless communication device 130. In some examples, the power supply block 146 can include a battery. In some examples, the power supply block 146 includes a power adapter (e.g., AC/DC or DC/DC) for connection to an external power source and can be used for charging the battery.

In at least some examples, instructions that cause the processing device 132 to carry out methods in accordance with example embodiments are stored in storage unit(s) 138 or memory 140 of the wireless communication device 130. In some examples, the processing device 132 may be one or more controllers, which may comprise a modulator or a processor. Example systems and methods described herein, in accordance with examples, can be implemented by the one or more controllers. The one or more controllers can comprise hardware, software, or a combination of hardware and software, depending on the particular component and function. In some examples, the one or more controllers can include analog or digital components, and can include one or more processors, one or more non-transitory storage mediums such as memory storing instructions executable by the one or more processors, one or more transceivers (or separate transmitters and receivers), one or more signal processors (analog or digital), and one or more analog circuit components.

Example embodiments can applied to MU communication, single user (SU) communication, trigger based (TB) communication, or extended range (ER) TB communication.

An example embodiment is a non-transitory computer-readable medium which stores instructions that when executed by a processing device causes the processing device to perform any of the described methods, processes or functions.

The example embodiments described above may be implemented by using hardware only or by using software and a necessary universal hardware platform. Based on such understandings, the technical solution of some example embodiments may be embodied in the form of a software product. The software product may be stored in a non-volatile or non-transitory storage medium, which can be a compact disk read-only memory (CD-ROM), Universal Serial Bus (USB) flash disk, or a removable hard disk. The software product includes a number of instructions that enable a computer device (personal computer, server, or network device) to execute the methods provided in the example embodiments. The software product may additionally include a number of instructions that enable a computer device to execute operations for configuring or programming a digital logic apparatus in accordance with example embodiments.

Example apparatuses and methods described herein, in accordance with example embodiments, can be implemented by one or more controllers. The controllers can comprise hardware, software, or a combination of hardware and software, depending on the particular application, component or function. In some example embodiments, the one or more controllers can include analog or digital components, and can include one or more processors, one or more non-transitory storage mediums such as memory storing instructions executable by the one or more processors, one or more transceivers (or separate transmitters and receivers), one or more signal processors (analog and/or digital), and/or one or more analog circuit components.

In the described methods or block diagrams, the boxes may represent events, steps, functions, processes, modules, messages, and/or state-based operations, etc. Although some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The example embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to include all suitable changes in technology.

The specification and drawings are, accordingly, to be regarded simply as an illustration, and are contemplated to cover any and all modifications, variations, combinations or equivalents.

What is claimed is:

1. A method performed by a processing device, the method comprising:
   generating a control signal to solicit an uplink transmission, the control signal including a first identifier indicating a wireless network version of the uplink transmission; and
   outputting the control signal in a trigger frame, wherein the first identifier is an identifier field or identifier subfield of the trigger frame.

2. The method of claim 1, wherein the control signal is a separate field from a signal (SIG) field particular to signaling information of the indicated wireless network version.

3. The method of claim 1, wherein the control signal includes a second identifier indicating a frame type of the uplink transmission.

4. The method of claim 1, wherein the indicated wireless network version is an Institute of Electrical and Electronics Engineers (IEEE) 802.11 version or an amendment version of the IEEE 802.11 version.

5. The method of claim 1, wherein the uplink transmission is an uplink multi-user transmission, an uplink Physical Layer Convergence Procedure (PLCP) Protocol Data Unit (PPDU), or an extended range trigger frame.

6. The method of claim 1, further comprising receiving the uplink transmission in accordance with the wireless network version.

7. A device, comprising:
   a processing device configured to:
   generate a control signal to solicit an uplink transmission, the control signal including a first identifier indicating a wireless network version of the uplink transmission; and
   output the control signal in a trigger frame, wherein the first identifier is an identifier field or identifier subfield of the trigger frame.

8. The device of claim 7, wherein the control signal is a separate field from a signal (SIG) field particular to signaling information of the indicated wireless network version.

9. The device of claim 7, wherein the control signal includes a second identifier indicating a frame type of the uplink transmission.

10. The device of claim 7, wherein the indicated wireless network version is an Institute of Electrical and Electronics Engineers (IEEE) 802.11 version or an amendment version of the IEEE 802.11 version.

11. A method performed by a processing device, the method comprising:

receiving as input a trigger frame, wherein the trigger frame includes a control signal for a to solicit an uplink transmission, the control signal including a first identifier indicating a wireless network version of the uplink transmission, wherein the first identifier is an identifier field or identifier subfield of the trigger frame.

12. The method of claim 11, wherein the control signal is a separate field from a signal (SIG) field particular to signaling information of the indicated wireless network version.

13. The method of claim 11, wherein the control signal includes a second identifier indicating a frame type of the uplink transmission.

14. The method of claim 11, wherein the indicated wireless network version is an Institute of Electrical and Electronics Engineers (IEEE) 802.11 version or an amendment version of the IEEE 802.11 version.

15. The method of claim 11, further comprising transmitting the uplink transmission in accordance with the wireless network version in response to the receiving as the input the trigger frame.

16. A device, comprising:

a processing device configured to:

receive as input a trigger frame, which includes a control signal to solicit an uplink transmission, the control signal including a first identifier indicating a wireless network version of the uplink transmission, wherein the first identifier is an identifier field or identifier subfield of the trigger frame.

17. The device of claim 16, wherein the control signal is a separate field from a signal (SIG) field particular to signaling information of the indicated wireless network version.

18. The device of claim 17, wherein the processing device is configured to transmit the uplink transmission in accordance with the wireless network version in response to the receiving as the input the trigger frame.

19. The device of claim 16, wherein the control signal includes a second identifier indicating a frame type of the uplink transmission.

20. The device of claim 16, wherein the indicated wireless network version is an Institute of Electrical and Electronics Engineers (IEEE) 802.11 version or an amendment version of the IEEE 802.11 version.

* * * * *